United States Patent [19]
Stutz et al.

[11] Patent Number: 5,794,038
[45] Date of Patent: *Aug. 11, 1998

[54] METHOD AND SYSTEM FOR NOTIFYING CLIENTS USING MULTICASTING AND FOR CONNECTING OBJECTS USING DELAYED BINDING

[75] Inventors: David S. Stutz, Redmond; Chris T. Westin, Issaquah, both of Wash.

[73] Assignee: Microsoft Corporation, Redmond, Wash.

[*] Notice: The term of this patent shall not extend beyond the expiration date of Pat. No. 5,517,645.

[21] Appl. No.: 559,694

[22] Filed: Nov. 15, 1995

Related U.S. Application Data

[63] Continuation of Ser. No. 147,683, Nov. 5, 1993, Pat. No. 5,517,645.

[51] Int. Cl.$^6$ ............................................. G06F 9/44
[52] U.S. Cl. ......................... 395/683; 395/685; 395/200.33
[58] Field of Search ............................ 395/701, 683, 395/685, 200.32, 200.33, 200.59

[56] References Cited

U.S. PATENT DOCUMENTS

| | | | |
|---|---|---|---|
| 4,800,488 | 1/1989 | Agrawal et al. | 364/200 |
| 5,307,490 | 4/1994 | Davidson et al. | 395/650 |
| 5,315,703 | 5/1994 | Matheny et al. | 395/164 |
| 5,517,645 | 5/1996 | Stutz et al. | 395/700 |
| 5,574,918 | 11/1996 | Hurley et al. | 395/561 |

FOREIGN PATENT DOCUMENTS

| | | | |
|---|---|---|---|
| 0 474 339 | 3/1992 | European Pat. Off. | G06F 9/44 |
| 0 495 279 | 7/1992 | European Pat. Off. | G06F 9/44 |

OTHER PUBLICATIONS

Control Integration and Its Role in Software Integration. Genie Logiciel & Systemes Experts, J. Arnold and G. Memmi, No. 30, pp. 14–24, Mar. 1993, France.

Distributed Object Computing with CORBA, C++ Report, vol. 5, No. 6, pp. 32–38, Jul.–Aug. 1993, USA.

Alphorn: A Remote Procedure Call Environment for Fault–Tolerant, Heterogeneous, Distributed Systems. H. Aschmann et al., IEEE Micro, vol. 11, No. 5, pp. 16–19, 60–67, Oct. 1991, USA.

COOL: System Support for Distributed Programming. Communications of the ACM, R. Lea et al., vol. 36, No. 9, pp. 37–46, Sep. 1993, USA.

Object–Oriented Program Construction. Wong, W., Dr. Dobb's Journal, Oct. 1992, pp. 36, 38, 40, 42, 116, and 118.

*Primary Examiner*—Emanuel Todd Voeltz
*Assistant Examiner*—Kakali Chaki
*Attorney, Agent, or Firm*—Seed and Berry LLP

[57] ABSTRACT

A method and system for managing the connection of client components to an interface implemented by a server component. In a preferred embodiment, a user component provides an implementation of an interface and a description of the interface. A component manager aggregates the user component into itself to form a server component. When a client requests a connection to the interface, the component manager retrieves a reference to the interface from the user component and sends the reference to the client components. In a preferred embodiment, the component manager tracks the client components connected through an interface. A user component may also provide multiple interfaces to client components which the component manager also tracks.

17 Claims, 38 Drawing Sheets ly inherited classes are supported in a C++ compiler that conforms to the model defined in U.S. patent application Ser. No. 07/682.537.

METHOD AND SYSTEM FOR NOTIFIYING CLIENTS USING MULTICASTING AND FOR CONNECTING OBJECTS USING DELAYED BINDING

CROSS-REFERENCE TO RELATED APPLICATION

This application is a continuation of U.S. patent application Ser. No. 08/147,683, filed Nov. 5, 1993, now U.S. Pat. No. 5,517,645.

TECHNICAL FIELD

This invention relates generally to a computer method and system for management of component connection.

BACKGROUND OF THE INVENTION

Computer systems often employ object-oriented techniques. An object is composed of instance data (data members) and member functions (method), which implement the behavior of the object. FIG. 1A is a block diagram of typical data structures used to represent an object. The data structures used to represent an object comprise instance data structure 1A01, virtual function table 1A02, and the function members 1A03, 1A04, 1A05. The instance data structure 1A01 contains a pointer to the virtual function table 1A02 and contains data members. The virtual function table 1A02 contains an entry for each virtual function member defined for the object. Each entry contains a reference to the code that implements the corresponding function member. The layout of this sample object conforms to the model defined in U.S. patent application Ser. No. 07/682,537, entitled "METHOD FOR IMPLEMENTING VIRTUAL FUNCTIONS AND VIRTUAL BASES IN A COMPILER FOR AN OBJECT ORIENTED PROGRAMMING LANGUAGE," filed Apr. 9, 1991, now U.S. Pat. 5,297,284, which is hereby incorporated by reference. In the following, an object will be described as an instance of a class as defined by the C++ programming language. One skilled in the art would appreciate that objects can be defined using other programming languages.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
{ public:
    int x, y;
    int radius;
    void draw();
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates on an instance of the class. An instance of a class is also called an object of the class.

In the syntax of C++, the following statement declares the objects a and b to be of type class CIRCLE.

CIRCLE a, b;

This declaration causes the allocation of memory for the objects a and b. The following statements assign data to the data members of objects a and b.

a.x=2;
a.y=2;
a.radius=1;
b.x=4;
b.y=5;
b.radius=2;

The following statements are used to draw the circles defined by objects a and b.

a.draw( );
b.draw( );

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{ public:
    int pattern;
    void fill();
};
```

This declaration specifies that class CIRCLE_FILL includes all the data and function members that are in class CIRCLE in addition to those data and function members introduced in the declaration of class CIRCLE_FILL, that is, data member pattern and function member fill. In this example, class CIRCLE_FILL has data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary (root) class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two nonvirtual base classes.

class CIRCLE_1: CIRCLE { ... };
class CIRCLE_2: CIRCLE { ... };
class PATTERN: CIRCLE_1, CIRCLE_2{ ... };

In this declaration class PATTERN inherits class CIRCLE twice nonvirtually through classes CIRCLE_1 and CIRCLE_2. There are two instances of class CIRCLE in class PATTERN.

The following is an example of a derived class with two virtual base classes.

class CIRCLE_1: virtual CIRCLE { ... };
class CIRCLE_2: virtual CIRCLE { ... };
class PATTERN: CIRCLE_1, CIRCLE_2{ ... };

The derived class PATTERN inherits class CIRCLE twice virtually through classes CIRCLE_1 and CIRCLE_2. Since the class CIRCLE is virtually inherited twice, there is only one object of class CIRCLE in the derived class PATTERN. One skilled in the art would appreciate virtual inheritance can be very useful when the class derivation is more complex.

A class may also specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
{ public:
int x, y;
int radius;
virtual void draw();
};
class CIRCLE_FILL : CIRCLE
{ public:
int pattern;
virtual void draw();
};
```

The C++ language provides a pointer data type. A pointer holds values that are addresses of objects in memory. Through a pointer, an object can be referenced. The following statement declares variable c_ptr to be a pointer on an object of type class CIRCLE and sets variable c_ptr to hold the address of object c.

CIRCLE *c_ptr;

c_ptr=&c;

Continuing with the example, the following statement declares object a to be of type class CIRCLE and object b to be of type class CIRCLE_FILL.

CIRCLE a;

CIRCLE_FILL b;

The following statement refers to the function draw as defined in class CIRCLE.

a.draw( );

Whereas, the following statement refers to the function draw defined in class CIRCLE_FILL.

b.draw( );

Moreover, the following statements type cast object b to an object of type class CIRCLE and invoke the function draw that is defined in class CIRCLE_FILL.

CIRCLE *c_ptr;

c_ptr=&b;

c_ptr->draw( ); // CIRCLE_FILL::draw( )

Thus, the virtual function that is called is function CIRCLE_FILL::draw.

An advantage of using object-oriented techniques is that these techniques can be used to facilitate the sharing of object structures. For example, object-oriented techniques facilitate the creation of compound documents. A compound document is a document that contains objects generated by various computer programs. (Typically, only the data members of the object and the class type are stored in a compound document.) A word processing document that contains a spreadsheet object generated by a spreadsheet program is a compound document. A word processing program allows a user to embed a spreadsheet object (e.g., a cell) within a word processing document. In one way to allow this embedding, the word processing program is typically compiled, using the class definition of the object to be embedded, to access function members of the embedded object. Thus, the word processing program would need to be compiled using the class definition of each class of objects that can be embedded in a word processing document. To embed an object of a new class into a word processing document, the word processing program would need to be recompiled with the new class definition. Thus, only objects of classes selected by the developer of the word processing program can be embedded. Using this technique, new classes can only be supported with a new release of the word processing program.

To allow objects of an arbitrary class to be embedded into compound documents, interfaces are defined through which an object can be accessed without the need for the word processing program to have access to the class implementation at compile time. An abstract class is a class in which a virtual function member has no implementation (pure). An interface is an abstract class with no data members and whose virtual functions are all pure.

The following C++ class definition is an example definition of an interface. In this example, for simplicity of explanation, rather than allowing any class of object to be embedded in its documents, a word processing program allows spreadsheet objects to be embedded. An object that provides an interface is a server object, and an object that uses an interface is a client object. Any spreadsheet object that provides this interface can be embedded, regardless of how the object is implemented. Moreover, any spreadsheet object, whether implemented before or after the word processing program is compiled, can be embedded.

```
class     ISpreadSheet
{ virtual void File() = 0;
  virtual void Edit() = 0;
  virtual void Formula() = 0;
  virtual void Format() = 0;
  virtual void GetCell (string RC, cell *pCell) = 0;
  virtual void Data() = 0;
}
```

The developer of a spreadsheet program would need to provide an implementation of the interface to allow the spreadsheet objects to be embedded in a word processing document. When the word processing program embeds a spreadsheet object, the program needs access to the code that implements the interface for the spreadsheet object. To access the code, each implementation is given a unique class identifier. For example, a spreadsheet object developed by Microsoft Corporation may have a class identifier of "MSSpreadsheet," while a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements every function member defined by the interface and the persistent registry is maintained, the word processing program can embed the developer's spreadsheet objects into a word processing document.

Various spreadsheet developers may wish, however, to implement only certain function members. For example, a spreadsheet developer may not want to implement database support, but may want to support all other function members. To allow a spreadsheet developer to support only some of the function members, while still allowing the objects to be embedded, multiple interfaces for spreadsheet objects are defined. For example, the interfaces IData and IBasicSpreadsheet may be defined for a spreadsheet object as follows.

```
class    IBasicSpreadsheet
         { virtual void File() = 0;
           virtual void Edit() = 0;
           virtual void Formula() = 0;
           virtual void Format() = 0;
           virtual void GetCell (string RC, cell *pCell) = 0;
         }
class    IData
         { virtual void Data() = 0;
         }
```

Each spreadsheet developer would implement the IBasicSpreadsheet interface and, optionally, the IData interface.

At run time, the word processing program (or any other client of the interface) would need to determine whether a spreadsheet object to be embedded supports the IData interface. To make this determination, another interface is defined (that every spreadsheet object implements) with a function member that indicates which interfaces are implemented for the object. This interface is named IUnknown (and referred to as the unknown interface or the object management interface) and is defined as follows.

```
class IUnknown
    { virtual HRESULT QueryInterface (REFIID iid, void **ppv) = 0;
      virtual ULONG AddRef() = 0;
      virtual ULONG Release () = 0;
    }
```

The IUnknown interface defines the function member (method) QueryInterface. The method QueryInterface is passed an interface identifier (e.g., "IData") in parameter iid (of type REFIID) and returns a pointer to the implementation of the identified interface for the object for which the method is invoked in parameter ppv. If the object does not support the interface, then the method returns a false. (The type HRESULT indicates a predefined status, and the type ULONG indicates an unsigned long integer.)

CODE TABLE 1A

```
HRESULT XX::QueryInterface(REFIID iid, void **ppv)
    { ret = TRUE;
      switch (iid)
      { case IID_IBasicSpreadsheet:
            *ppv = *pIBasicSpreadsheet;
            break;
        case IID_IDatabase:
            *ppv = *pIData;
            break;
        case IID_IUnknown:
            *ppv = this;
            break;
        default:
            ret = FALSE;
      }
      if(ret == TRUE){AddRef();};
      return ret;
    }
```

Code Table 1A contains C++ pseudocode for a typical implementation of the method QueryInterface for class XX, which inherits the class IUnknown. If the spreadsheet object supports the IData interface, then the method QueryInterface includes the appropriate case label within the switch statement. The variables pIBasicSpreadsheet and pIData point to a pointer to the virtual function tables of the IBasicSpreadsheet and IData interfaces, respectively. The method QueryInterface invokes the method AddRef (described below) to increment a reference count for the object of class XX when a pointer to an interface is returned.

CODE TABLE 1B

```
void XX::AddRef() {refcount++;}
void XX::Release() {if(--refcount==0) delete this;}
```

The interface IUnknown also defines the methods AddRef and Release, which are used to implement reference counting. Whenever a new reference to an interface is created, the method AddRef is invoked to increment a reference count of the object. Whenever a reference is no longer needed, the method Release is invoked to decrement the reference count of the object and, when the reference count goes to zero, to deallocate the object. Code Table 1B contains C++ pseudocode for a typical implementation of the methods AddRef and Release for class XX, which inherits the class IUnknown.

The IData interface and IBasicSpreadsheet interface inherit the IUnknown interface. The following definitions illustrate the use of the IUnknown interface.

```
class IData : public IUnknown
    { public:
        virtual void Data() = 0;
    }
class IBasicSpreadsheet : public IUnknown
    { public:
        virtual void File() = 0;
        virtual void Edit() = 0;
        virtual void Formula() = 0;
        virtual void Format() = 0;
        virtual void GetCell (string RC, cell *pCell) = 0;
    }
```

FIG. 1B is a block diagram illustrating a sample data structure of a spreadsheet object. The spreadsheet object comprises object data structure 1B01, IBasicSpreadsheet interface data structure 1B03, IData interface data structure 1B04, the virtual function tables 1B02, 1B05, 1B06 and methods 1B07 through 1B21. The object data structure 1B01 contains a pointer to the virtual function table 1B02 and pointers to the IBasicSpreadsheet and IData interface. Each entry in the virtual function table 1B02 contains a pointer to a method of the IUnknown interface. The IBasic interface data structure 1B03 contains a pointer to the virtual function table 1B05. Each entry in the virtual function table 1B05 contains a pointer to a method of the IBasicSpreadsheet interface. The IData interface data structure 1B04 contains a pointer to the virtual function table 1B06. Each entry in the virtual function table 1B06 contains a pointer to a method of the IData interface. Since the IBasicSpreadsheet and IData interfaces inherit the IUnknown interface, each virtual function table 1B05 and 1B06 contains a pointer to the methods QueryInterface, AddRef, and Release. In the following, an object data structure is represented by the shape 1B22 labeled with the interfaces through which the object may be accessed.

The following pseudocode illustrates how a word processing program determines whether a spreadsheet object supports the IData interface.

if (pIBasic->QueryInterface("IData", &pIData)=S_OK)
\* IData supported else
\* IData not supported The pointer pIBasicSpreadsheet is a pointer to the IBasicSpreadsheet interface of the object. If the object supports the IData interface, the method QueryInterface sets the pointer pIData to point to the IData data structure and returns the value S_OK.

Normally, an object can be instantiated (an instance of the object created in memory) by a variable declaration or by the "new" operator. However, both techniques of instantiation need the class definition at compile time. A different technique is needed to allow a word processing program to instantiate a spreadsheet object at run time. One technique provides a global function CreateInstanceXX, which is defined in the following.

static void CreateInstanceXX (REFIID iid, void **ppv) =0;

The method CreateInstanceXX (known as a class factory) instantiates an object of class XX and returns a pointer ppv to the interface of the object designated by parameter iid.

SUMMARY OF THE INVENTION

It is an object of the present invention to provide a method and system for managing the interaction between components.

It is an object of the present invention to provide a method and system that is not limited to any single problem domain.

It is an object of the present invention to provide a method and system for managing the interaction between components that can be shared by all components.

It is an object of the present invention to provide a method and system for managing the interaction between components in a way that minimizes overhead.

It is another object of the present invention to provide a method and system to store components persistently across activations.

These and other objects, which will become apparent as the invention is described in detail below, are provided by a method and system for managing the connection of client components to an interface implemented by a server component. In a preferred embodiment, a user component provides an implementation of an interface and a description of the interface. A component manager aggregates the user component into itself to form a server component. When a client requests a connection to the interface, the component manager retrieves a reference to the interface from the user component and sends the reference to the client components. In a preferred embodiment, the component manager tracks the client components connected through an interface. A user component may also provide multiple interfaces to client components which the component manager also tracks.

DETAILED DESCRIPTION OF THE INVENTION

The present invention provides a method and system for managing the sharing of interfaces between components. In a preferred embodiment, a user component provides an implementation of an interface and a description of the interface. A component manager aggregates the user component into itself to form a server component. When a client component requests a connection to the interface, the component manager retrieves a reference to the interface from the user component and sends the reference to the client component. In a preferred embodiment, the component manager tracks the client components connected through an interface. A user component may also provide multiple interfaces to client components which the component manager also tracks.

A component provides services to various other components. These services are provided through an interface that the component implements. A component that provides an interface is referred to as server component (server), and a component that uses the services of the interface is a client component (client). A client component is passed a pointer to the interface and requests services by invoking the methods of the interface. In certain cases, the client component may want to be notified directly by the server component of some event, or the server component may want to retrieve information from its client component. In these certain cases, the client component provides an interface, referred to as a reverse interface, to the server component. The server component is passed a pointer to the reverse interface and requests services by invoking methods of the reverse interface. Typically, a server component provides a specific interface and request services of the client component through a specific reverse interface. The combination of the specific interface and reverse interface is known as a protocol. Protocols may be either unidirectional or bidirectional. A unidirectional protocol is one in which the client component does not provide a reverse interface. Thus, services are only provided by the server component. A bidirectional protocol is one in which both the client and server components provide interfaces. Thus, services are provided by both the server and client components. A connection is established via a protocol between a server component and a client component by passing a pointer to the interface from the server to the client and if the protocol is bidirectional, passing a pointer to the reverse interface from the client to the server.

Figure 1A:
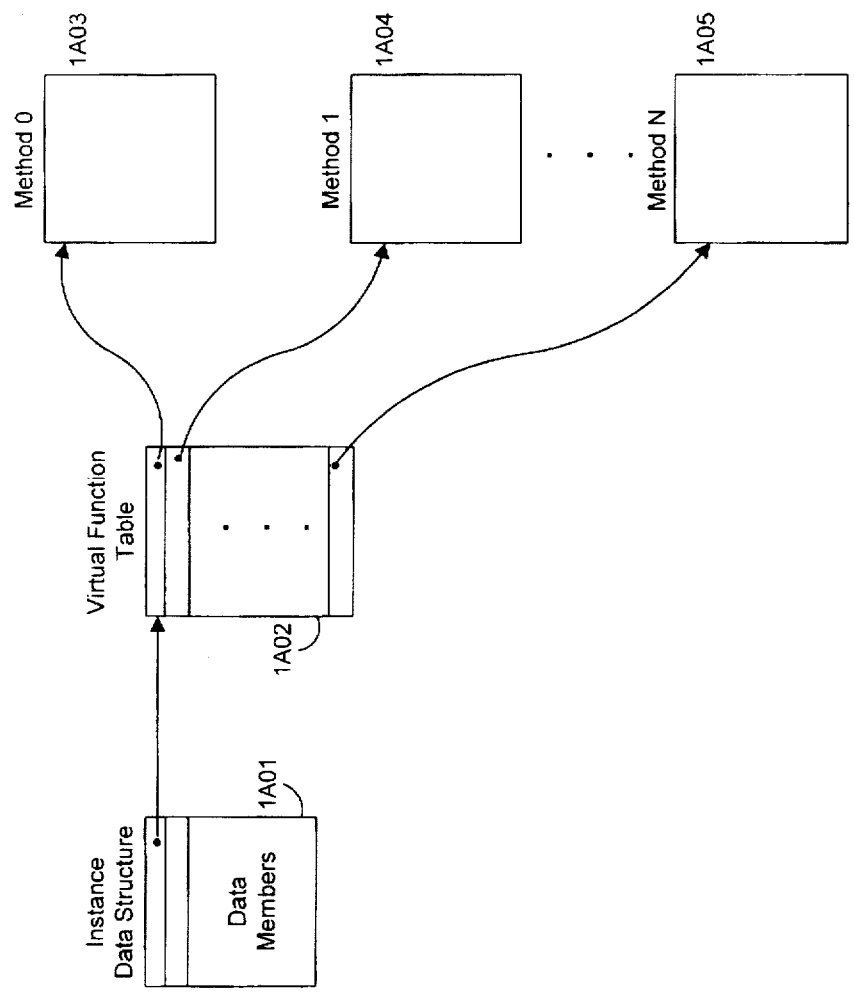
FIG. 1A is a block diagram of typical data structures used to represent an object.
Figure 1B:
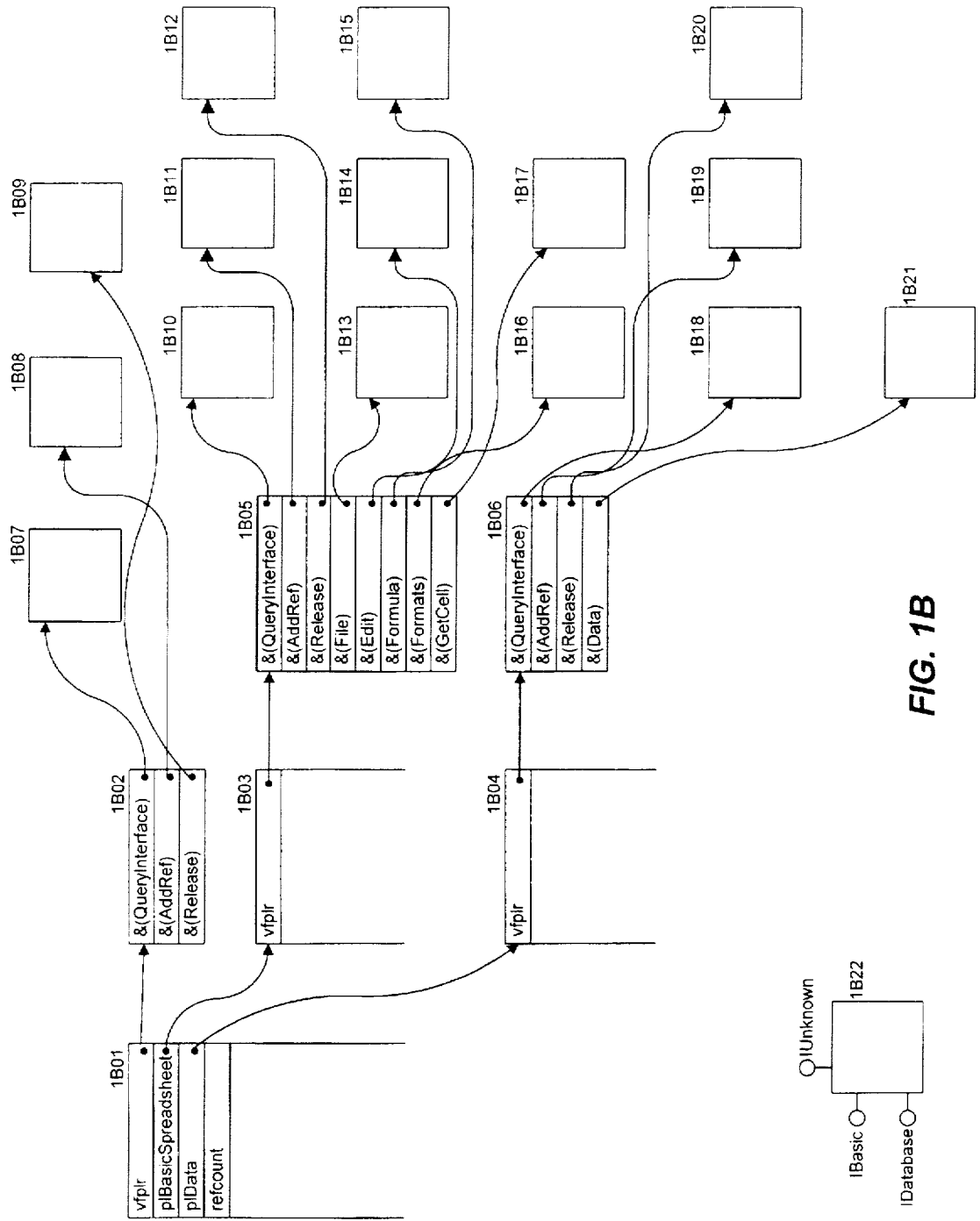
FIG. 1B is a block diagram illustrating a sample data structure of a spreadsheet object.
Figure 1C:
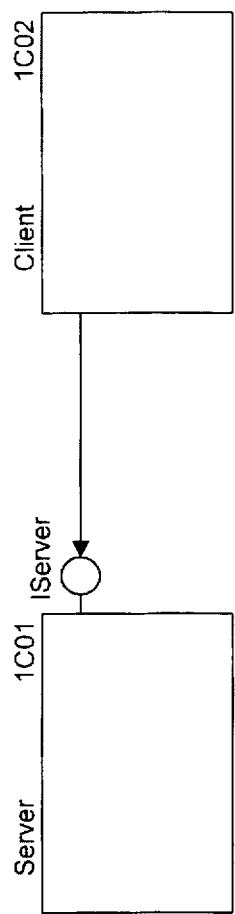
FIG. 1C is a block diagram illustrating a unidirectional connection.
Figure 1D:
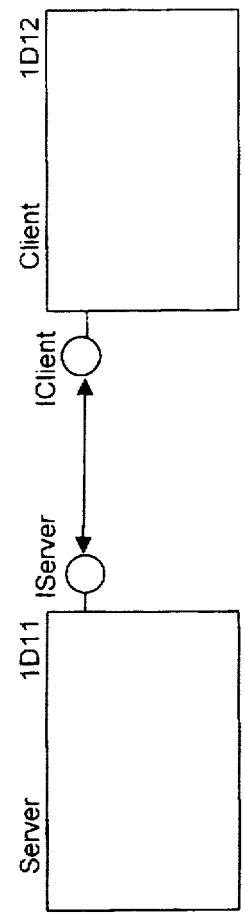
FIG. 1D is a block diagram illustrating a bidirectional connection.

FIG. 1C is a block diagram illustrating a unidirectional connection. The server 101 provides the IServer interface to the client 102. The client 102 contains a pointer to the IServer interface. FIG. 1D is a block diagram illustrating a bidirectional connection. The server 111 provides the IServer interface, and the client 112 provides the IClient interface. The server 111 contains a pointer to the IClient interface, and the client 112 contains a pointer to the IServer interface. The server 111 and the client 112 are connected via the IServer/IClient protocol.

In the case of a bidirectional protocol, both the server component and the client component provide services to the other. Thus, each component can be considered to be both a server and a client of services. By specifying a certain protocol that it supports, a component is identifying services it provides and services it requires of a client component. In the following, one interface of a protocol will be referred to as a jack interface, and the other interface will be referred to as a plug interface. The component that provides the jack interface is said to provide the jack connection of the protocol, and the component that provides the plug interface is said to provide the plug connection of the protocol.

Figure 1E:
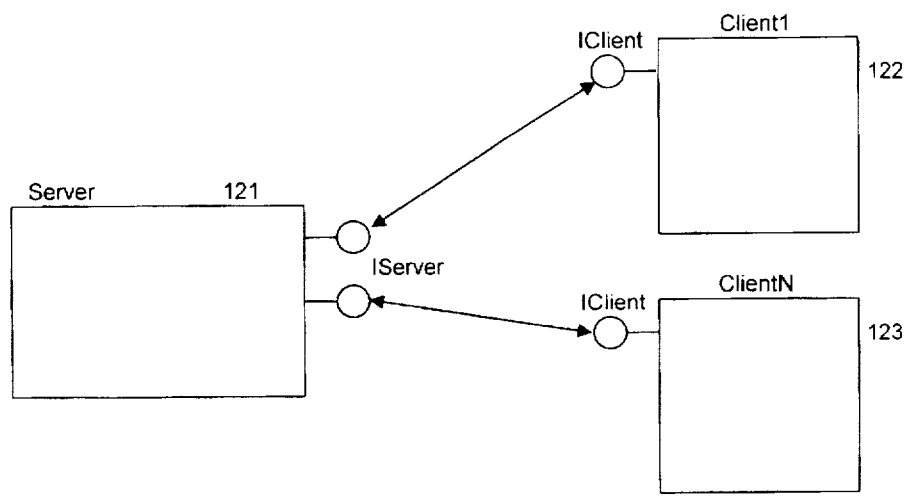
FIG. 1E is a block diagram illustrating multiple connections through a protocol.

A component may allow multiple connections to be established for a protocol. FIG. 1E is a block diagram illustrating multiple connections through a protocol. The server 121 provides the IServer interface and clients 122 and 123 each provide an implementation of the IClient interface. The server 121 contains a pointer to each IClient interface, and each client 122 and 123 contains a pointer to an IServer interface. The server 121 may provide different pointers to each client to allow the server to maintain state information for each client and to identify the client requesting a service.

Figure 1F:
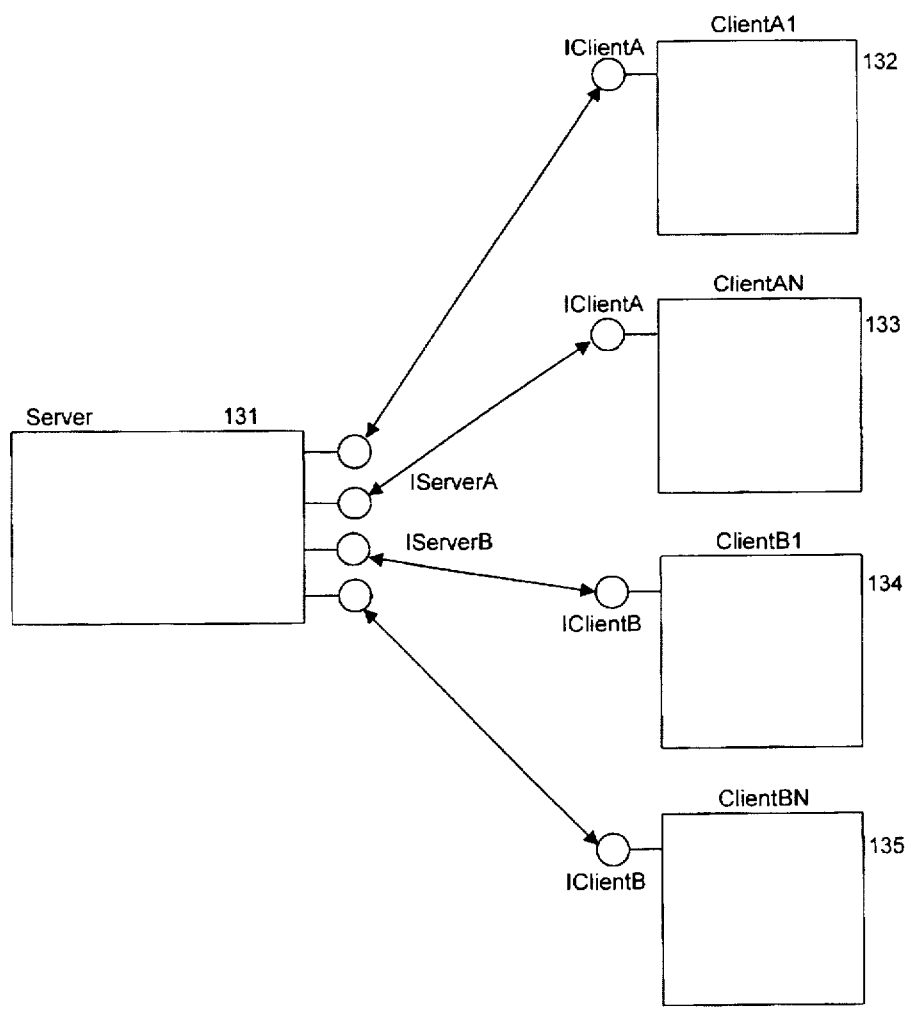
FIG. 1F is a block diagram illustrating a component that supports multiple protocols.

A component may also support multiple protocols and multiple connections may be established for each protocol. FIG. 1F is a block diagram illustrating a component that supports multiple protocols. Server 131 supports the IServerA/IClientA protocol and the IServerB/IClientB protocol. Clients 132 and 133 are connected through the IServerA/IClientA protocol, and clients 134 and 135 are connected through the IServerB/IClientB protocol.

The present invention provides a method and system for controlling the establishing of connects between components. In a preferred embodiment, a component that provides an implementation of an interface of a protocol is a user component. A user component is aggregated with a component manager object to form a component object. The component manager object (component manager) manages the establishing and tracking of connections to the interfaces provided by the user component. The component manager provides interfaces through which connections can be established in a domain independent manner.

Figure 2A:
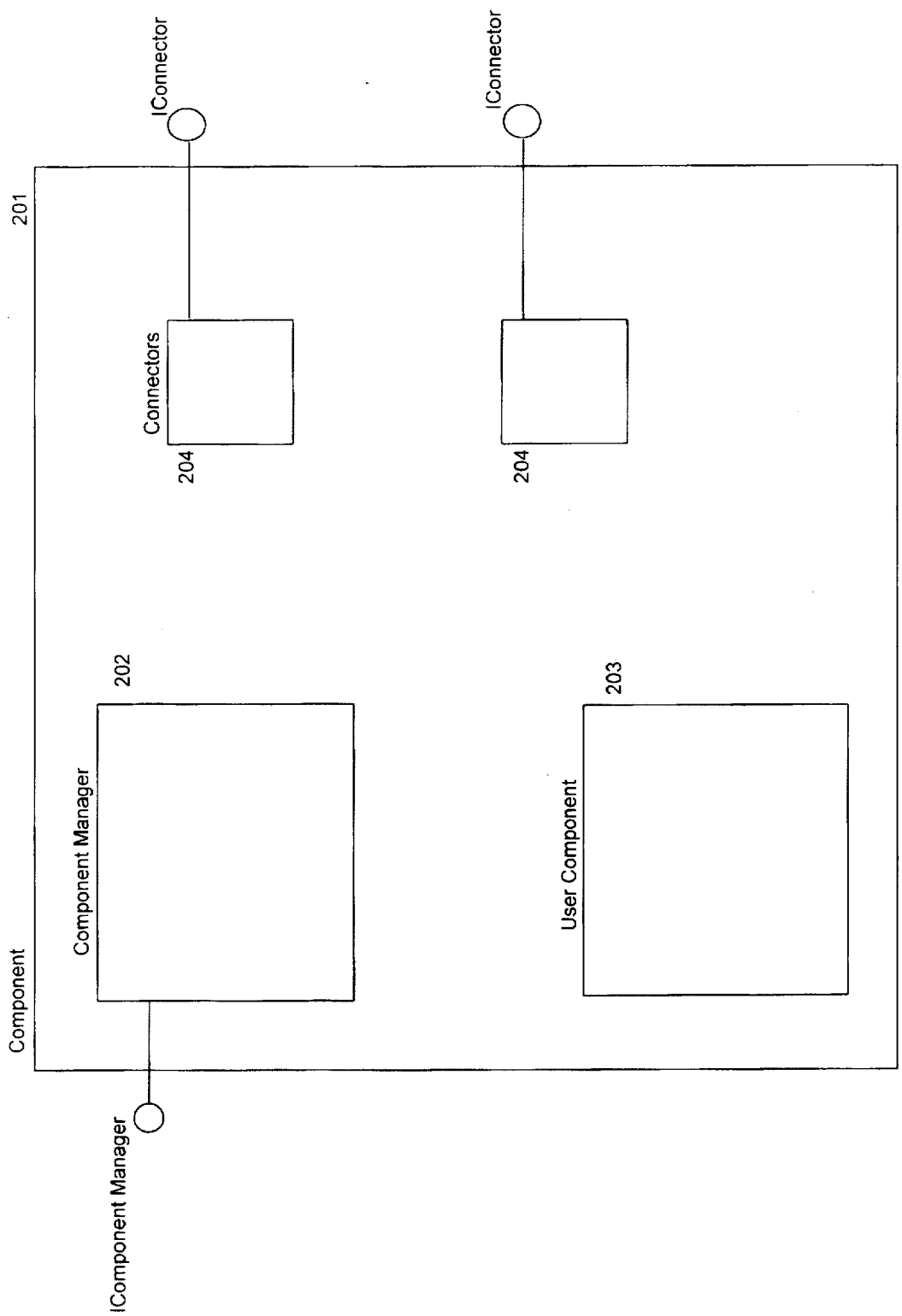
FIG. 2A is a block diagram illustrating the structure of a preferred component.

FIG. 2A is a block diagram illustrating the structure of a preferred component. Component object 201 comprises component manager 202, user component 203, and connector objects 204 (connectors). The component manager 202 manages connecting the component 201 to other components through protocols provided by the user component 203. The component manager provides an IComponentManager interface for controlling the connecting of components. The user component 103 provides the domain specific behavior of the interfaces. The connectors 104 are created by the component manager, track the state of connections, and provide an IConnector interface for controlling connections.

Figure 2B:
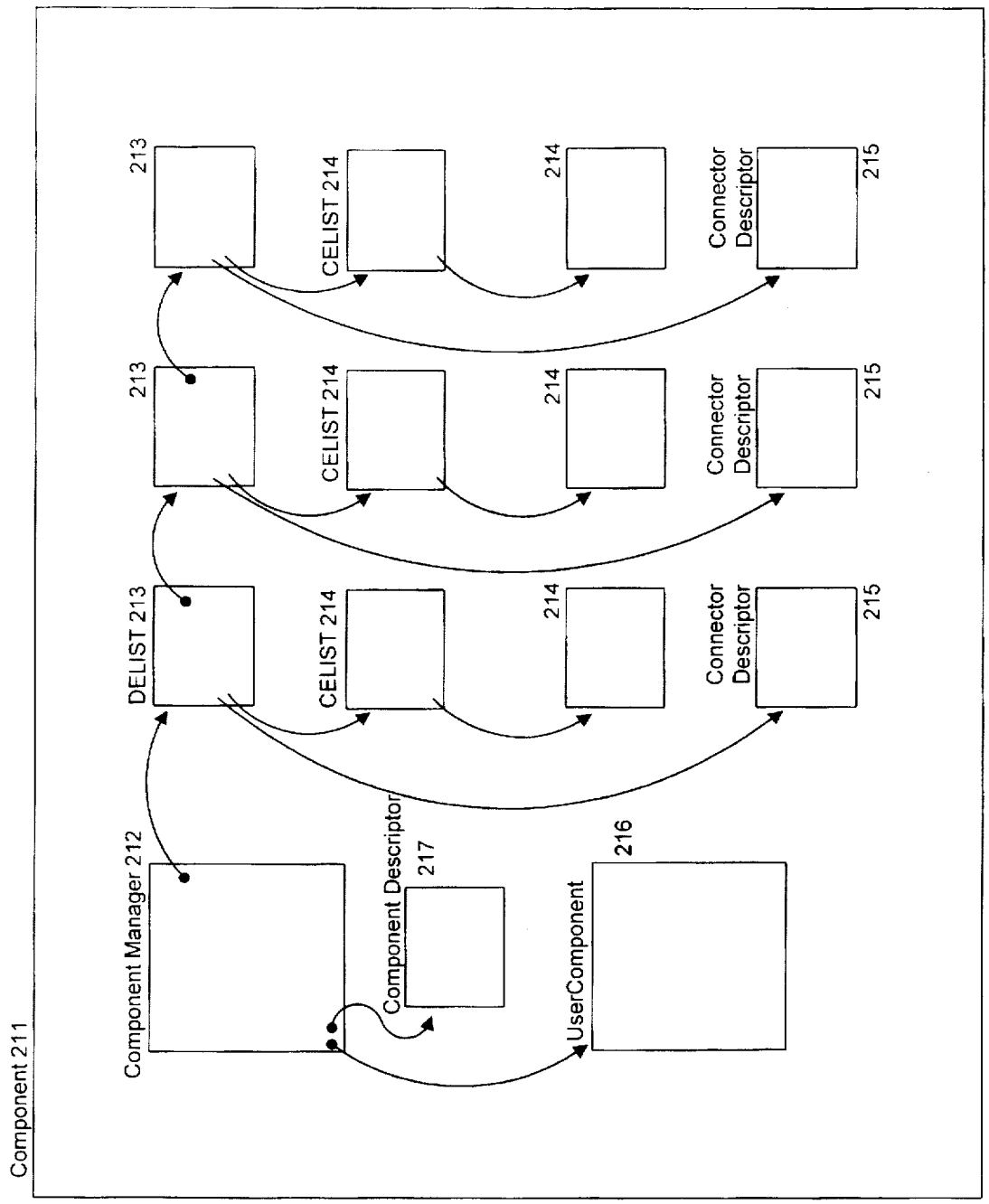
FIG. 2B is a block diagram illustrating a preferred data structure of a component manager.

FIG. 2B is a block diagram illustrating a preferred data structure of a component manager. A component 211 comprises a component manager 212 and a link list of connector descriptor entries 213 (a DEList). Each descriptor entry points to a link list of connector entries 214 (a CEList) and to a connector descriptor 215. The component manager creates one descriptor entry for each protocol provided by the user component. The component manager creates a connector entry for each connection for the given protocol. Each connector descriptor is provided by the user component and describes one protocol provided by the user component. The component manager 212 points to the user component 216 and a component descriptor 217. The component descriptor is provided by the user component and describes attributes of the component.

Figure 3:
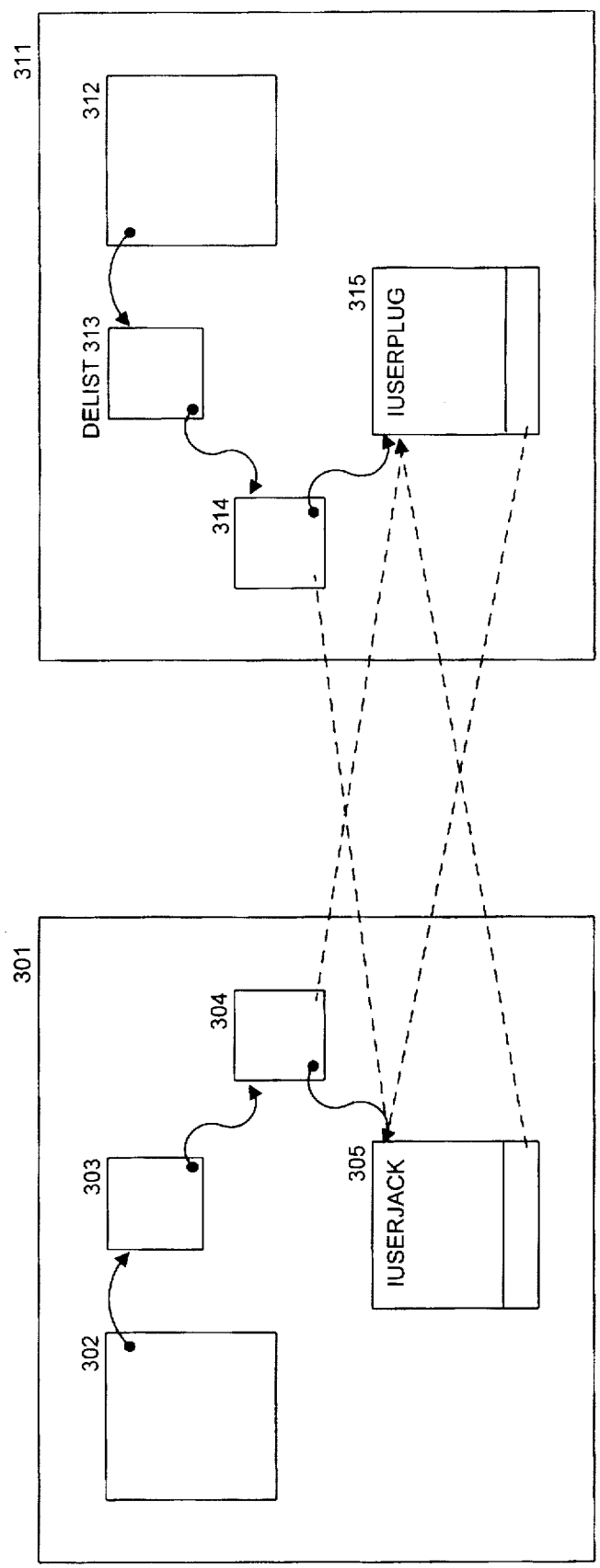
FIG. 3 is a block diagram illustrating an example of a connection between two components in a preferred embodiment.

The present invention provides various functions that can be used to connect components. In one embodiment, these functions can be provided through an IComponent interface provided by a component manager. A basic function is the function ComponentNewConnector, which "extrudes" a connector for the specified protocol. To extrude a connector, the component manager creates a new connector entry for the specified protocol and returns a pointer to the IConnector interface of the new connector entry. When both a plug and a jack connector for a protocol are extruded, they can be connected with the function ComponentConnect. The function ComponentConnect stores a pointer to the reverse interface in each user component and initializes state information to track the connection. FIG. 3 is a block diagram illustrating an example of a connection between two components in a preferred embodiment. Components 301 and 311 are to be connected via the IUSERJACK/IUSERPLUG protocol. Component 301 contains component manager 302 and descriptor entry 303, which describes the IUSERJACK interface. Component 301 is requested to extrude jack connector 304 for the IUSERJACK interface. The component manager 302 searches the descriptor entries for the IUSERJACK interface entry 303 and instantiates jack connector 304. The jack connector 304 contains a pointer to the IUSERJACK interface provided by the user component 305. Similarly, component 311 contains component manager 312 and descriptor entry 313, which describes the IUSERPLUG interface. Component 311 is requested to extrude plug connector 314 for the IUSERPLUG interface. The component manager 312 searches the descriptor entries for the IUSERPLUG interface entry and instantiates plug connector 314. The plug connector 314 contains a pointer to the IUSERPLUG interface provided by the user component 315.

Once the jack connector 304 and the plug connector 314 are extruded, then the components can be connected through these connectors. In one embodiment, a function ComponentConnect is passed both the jack connector 304 and the plug connector 314 by passing pointers to their IConnector interface. The function ComponentConnect sets the jack connector 304 and the user component 305 to point to the IUSERPLUG interface (illustrated by dashed lines). Similarly, the function ComponentConnect sets the plug connector 314 and the user component 315 to point to the IUSERJACK interface (illustrated by dashed lines). The user components 305 and 315 can now access the methods of their reverse interfaces through the reverse interface pointers.

CODE TABLE 2A

```
struct ComponentDescriptor
{
    ULONG flag;
    ULONG cConnectors;
    const ConnectorDescriptor FAR *pConnDesc;
    HRESULT (FAR *Create) (IUnknown FAR *pUnkOuter,
            struct ComponentManager FAR *pComponentManager,
            IUnknown FAR *FAR *ppIUnk,
            REFCLSID clsid);
};
```

CODE TABLE 2B

```
struct ConnectorDescriptor
{
    const IID *piid;
    const IID *piidm;
    LPCTSTR iname;
    ULONG flag;
    ULONG cMaxConnectors;
    size_t RevIfacePtrOff;
    IUnknown FAR *(FAR *Create) (IUnknown FAR *pController,
            IUnknown FAR *pComponent);
    void (FAR *Delete)(IUnknown FAR *pConnector);
    void (FAR *Connect)(IUnknown FAR *pConnector);
    void (FAR *Disconnect)(IUnknown FAR *pConnector);
}
```

During component creation, the user component provides to the component manager a component descriptor. Code Table 2A contains a component descriptor data structure. The component descriptor contains a pointer an array of connector descriptors (pConnDesc), a count of the number of entries in the array (cConnectors), a pointer to a create callback routine into the user component (*Create), and a flag (flag). The component manager invokes the create callback routine during component creation. The flag describes various attributes of the component as described below.

Each connector descriptor contains the interface id of the interface provided by the user component (piid) and the corresponding reverse interface id (piidm), an instance name (iname), maximum number of connectors (cMaxConnectors), the offset of the reverse interface pointer in the user component (RevIfacePtrOff), various callback routines into the user component, and a flag (flag). Code Table 2B contains a connector descriptor data structure. The interface id specifies the interface of the protocol that the user component provides and the reverse interface id specifies the interface that the user component expects to be provided by the connected to component. The instance name is used to distinguish multiple implementations of the same protocol that are provided by the user component. The maximum number of connectors indicates the maximum number of connectors for the described protocol that can be extruded at one time. The offset of the reverse interface pointer into the user component indicates to the component manager the location of the reverse interface pointer relative to the provided interface pointer. The component manager notifies the user component of changes in the state of connection through various callback routines. In a preferred embodiment, a user component is notified that a connector is extruded, connected, disconnected, and deleted through callback routines. The flag describes various attributes of the connector as described below.

The present invention provides various functions to create connectors and establish connections between components. The functions include a function to create a new connector (ComponentNewConnector), a function to connect two connectors (ComponentConnect), a function to disconnect two connectors (ComponentDisconnect), and a function to delete a connector (ComponentDeleteConnector). In addition, a preferred embodiment also provides functions to enumerate the connector descriptors and the connectors.

Figure 4:
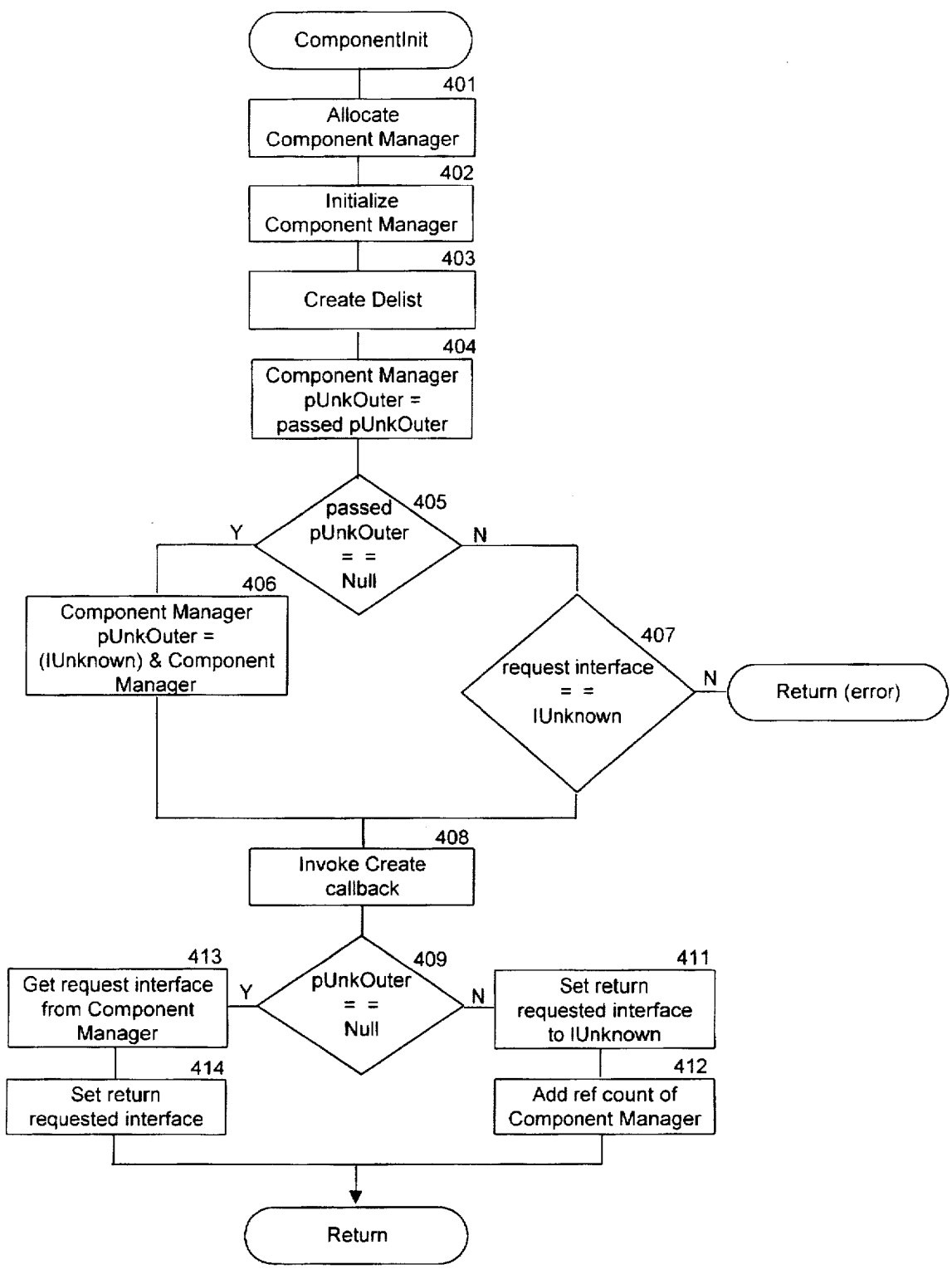
FIG. 4 is a flow diagram of the function ComponentInit.

The present invention also provides a function to initialize the component manager (ComponentInit). When a user component is created, the user component class factory invokes the function ComponentInit passing the class id of the user component and a component descriptor that points to an array of connector descriptors. The function creates a component manager object and creates and aggregates the user component. (The aggregation of objects described in U.S. patent application Ser. No. 07/996,552, entitled "METHOD AND SYSTEM FOR AGGREGATING OBJECTS," filed Dec. 24, 1992, now abandoned, which is hereby incorporated by reference.) The function also creates the DEList corresponding to the array of connector descriptors. A preferred prototype of the function ComponentInit is STDAPI ComponentInit( IUnknown FAR *pUnkOuter, REFIID riid, IUnknown FAR *FAR *ppIUnk, const ComponentDescriptor FAR *pCompDesc, REFCLSID clsid);

The parameter pUnkOuter points the controlling IUnknown interface; the parameter riid is the interface id of the interface to be returned in parameter ppIUnk; the parameter pCompDesc is a pointer to the component descriptor; and parameter clsid is the class id of the user component. FIG. 4 is a flow diagram of the function ComponentInit. In step 401, the function allocates a component manager object. In step 402, the function initializes the component manager by setting the DEList to empty. In step 403, the function creates and adds a descriptor to the DEList corresponding to each connector descriptor specified in the array of connector descriptors. In steps 404–407, the function aggregates the component into an aggregate object if the parameter pUnkOuter is not NULL. In step 404, the function sets the pUnkOuter for the component manager equal to the parameter pUnkOuter. In step 405, if the parameter pUnkOuter equals NULL, then the function continues at step 406, else the function continues at 407. In step 406, the function sets the pUnkOuter of the component manager to point to the IUnknown interface of the component manager and continues at step 408. In step 407, if the requested interface is not the IUnknown interface, then the function returns. In step 408, the function invokes the create callback of the user component specified in the component descriptor. The create callback creates a user component and aggregates it into the component. The function sets the component manager to point to the user component. In steps 409 through 414, the function retrieves a pointer to the interface specified by the parameter riid. In step 409, if the parameter pUnkOuter is NULL, then the function continues at step 413, else the function continues at step 411. In step 411, the function sets the requested interface to the IUnknown interface. In step 412, the function increments the reference count of the component manager and returns. In step 413, the function retrieves the requested interface by invoking the method QueryInterface of the controlling IUnknown. In step 414, the function returns the requested interface.

Once a component is created and initialized, connectors may extruded and connected. The function ComponentNewConnector creates a connector for the specified interface id and returns a pointer to the IConnector interface of the connector. A preferred prototype of the function ComponentNewConnector is STDAPI ComponentNewConnector(
   ComponentManager FAR *pCM,
   REFIID riid,
   LPCTSTR pName,
   IConnector FAR * FAR *ppIConnector);

The parameter pCM points to the component manager of the component; the parameter riid is the interface id of and the parameter pName is the instance name of the descriptor entry describing the protocol for which a connector to be created; and the parameter ppIConnector is a pointer to the created connector. The connector contains a pointer to the interface provided by the user component. The function invokes the create callback for the descriptor entry to retrieve the pointer to the interface. In a preferred embodiment, the function ComponentNewConnector invokes a method NewConnector of the IComponentJack interface of the passed component manager to create a new connector. The method NewConnector is described below.

Figure 5:
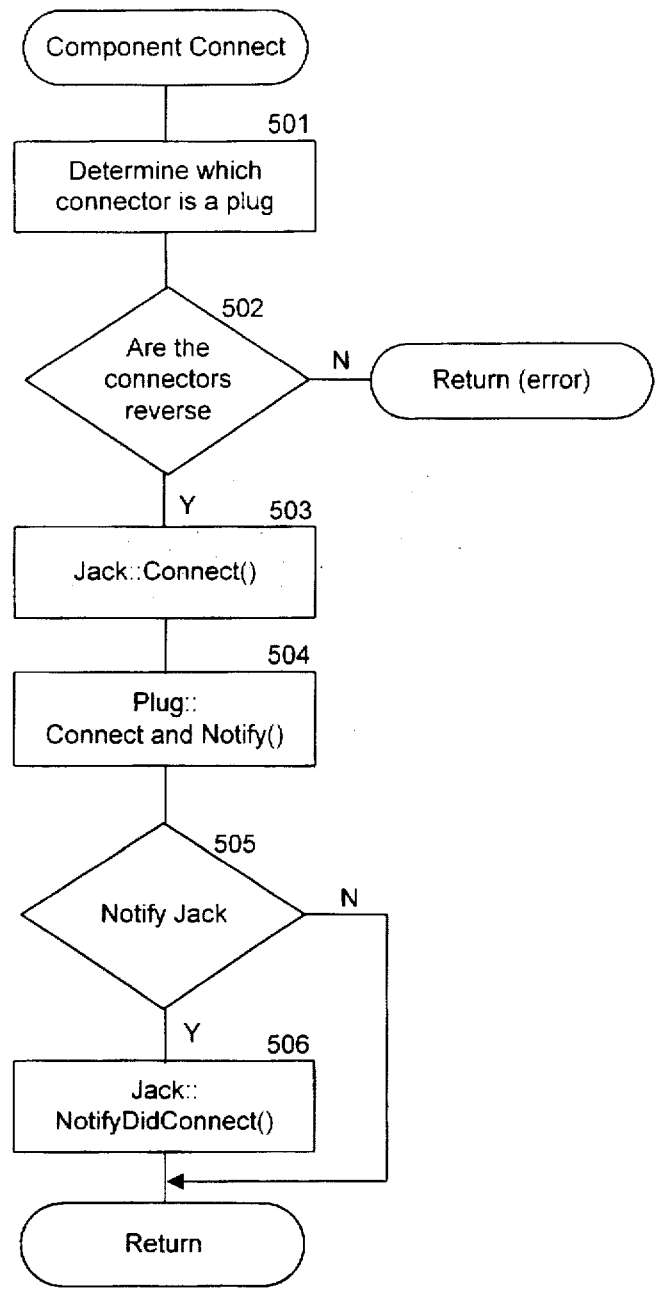
FIG. 5 is a flow diagram of the function ComponentConnect.

A connection is established by invoking the function ComponentConnect. This function is passed pointers to two connectors (IConnector interface). The function determines which connector is a plug and a jack, and ensures that they represent reverse interfaces of a protocol. The function then invokes the method Connect of the jack connector and then the method ConnectAndNotify of the plug connector. If the method Connect of the jack connector returns an indication that the jack connector is to be notified when the method ConnectAndNotify of plug connector returns, then the function invokes the method NotifyDidConnect of the jack connector. The user component of either component may be notified via the connect callback specified in the connector descriptor. By convention, the user component of the plug connector is notified of the connection by the component manager before the user component of the jack connector is notified. Thus, a plug connector may be used to perform connection specific initialization. A preferred prototype of the function ComponentConnect is STDAPI ComponentConnect(
   IConnector FAR *pIConnector1
   IConnector FAR *pIConnector2);

The parameters pIConnector1 and pIConnector2 point to the connectors to be connected. FIG. 5 is a flow diagram of the function ComponentConnect. In step 501, the function determines which connector is a plug. In step 502, if the connectors do not represent reverse interfaces of a protocol, then the function returns an error. In step 503, the function invokes the method Connect of the jack connector passing a pointer to the plug connector. The method Connect returns a flag indicating whether the jack connector is to be notified after the connection to the plug connector is complete. In step 504, the function invokes the method ConnectAndNotify of the plug connector passing a pointer to the jack connector. In step 505, if the jack connector is not to be notified, then the function returns. In step 506, the function invokes the method NotifyDidConnect of the jack connector and returns. Once a connection is established, the user components can use the reverse interface pointer to access the methods of the interface.

Figure 6:
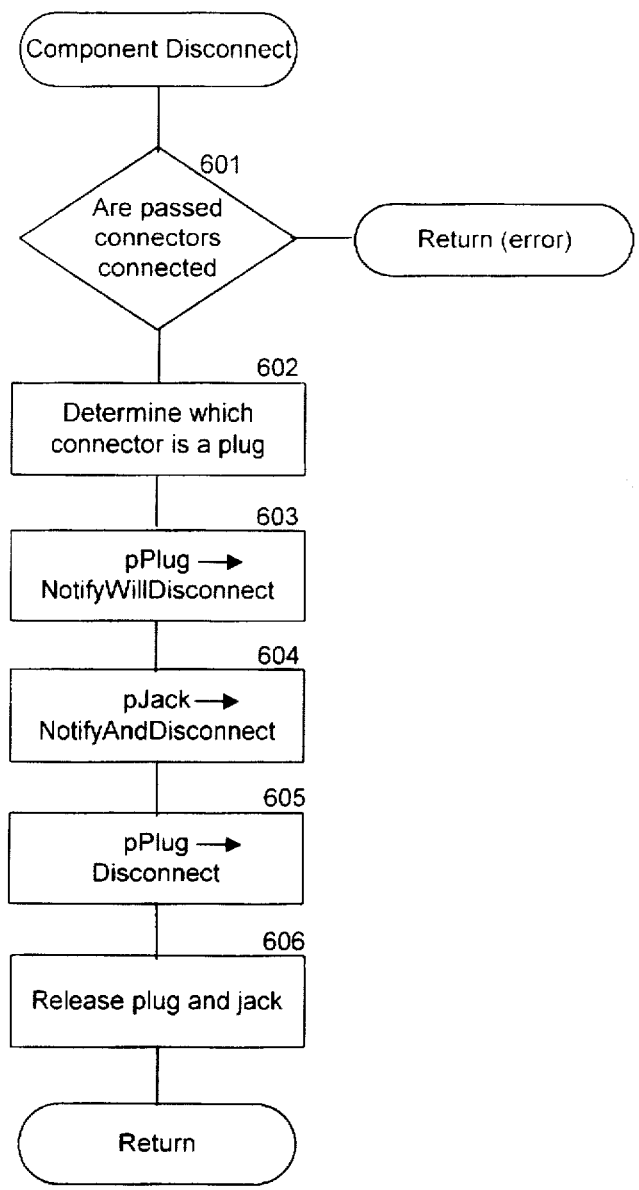
FIG. 6 is a flow diagram of the function ComponentDisconnect.

A connection is broken by invoking the function ComponentDisconnect. The function ComponentDisconnect ensures that the passed connectors are connected and determines which connector is the jack and plug connector. The function then invokes the method NotifyWillDisconnect of the plug connector, the method NotifyAndDisconnect of the jack connector, and the method Disconnect of the plug connector. A preferred prototype of the function ComponentDisconnect is STDAPI ComponentDisconnect(
   IConnector FAR *pIConnector1,
   IConnector FAR *pIConnector2);

The parameters pIConnector1 and pIConnector2 point to the IConnector interfaces of the connectors to be disconnected. FIG. 6 is a flow diagram of the function ComponentDisconnect. In step 601, if the passed connectors are not connected, then the function returns an error. In step 602, the function determines which connector is a plug and a jack. In step 603, the function invokes the method NotifyWillDisconnect of the plug connector. In step 604, the function invokes the method NotifyAndDisconnect of the jack connector. In step 605, the function invokes the method Disconnect of the plug connector. In step 606, the function releases the plug and jack connectors and returns.

CODE TABLE 3

```
class IJack
{
    STDMETHOD Connect(
        IPlug FAR *pIP,
        ULONG FAR *pCDFlag,
        ULONG FAR *pFlag,
        IID FAR *pJackIID,
        IID FAR *pPlugIID)=0;
    STDMETHOD NotifyDidConnect()=0;
```

CODE TABLE 3-continued

```
STDMETHOD NotifyAndDisconnect()=0;
STDMETHOD Disconnect()=0;
}
class IPlug
{
    STDMETHOD ConnectAndNotify()=0;
    STDMETHOD NotifyWillDisconnect()=0;
    STDMETHOD Disconnect()=0;
}
```

Code Table 3 contains the interface descriptions for the IJack and IPlug interfaces. A jack connector provides the IJack interface and a plug connector provides the IPlug interface. The methods of these interfaces are used to establish the connection between components.

Figure 7:
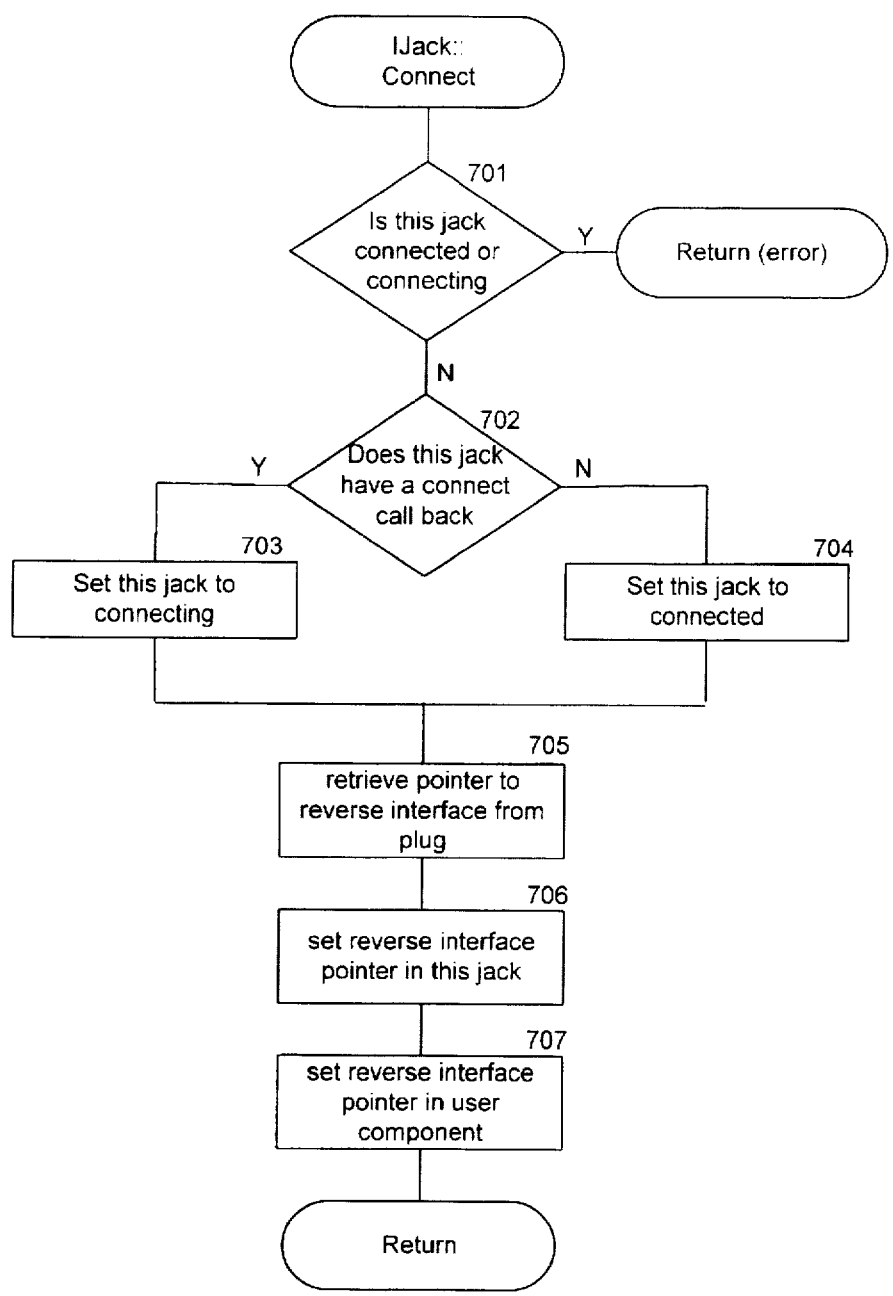
FIG. 7 is a flow diagram of the method Connect of the IJack interface.

FIG. 7 is a flow diagram of the method Connect of the IJack interface. The method is passed a pointer to a plug (pIP) and connects this jack (indicated by the "this" pointer) to that plug. The method returns the identifier of the jack and plug interfaces (pJackID) and pPlugID), a descriptive flag for this jack (pCDflag), and a flag indicating whether this jack is to be notified when the connection is complete (pFlag). In step 701, if this jack is connecting or connected, then the method returns an error. In step 702, if the user component for this jack wants to be notified, as indicated by the connect callback, then the method continues at 703, else the method continues at 704. In step 703, the method sets this jack to indicate connecting. In step 704, the method sets this jack to indicate connected. In step 705, the method retrieves a pointer to the plug interface from the passed plug. In step 706, the method set the reverse interface pointer of this jack. In step 707, the method sets the reverse interface pointer of the user component and returns.

Figure 8:
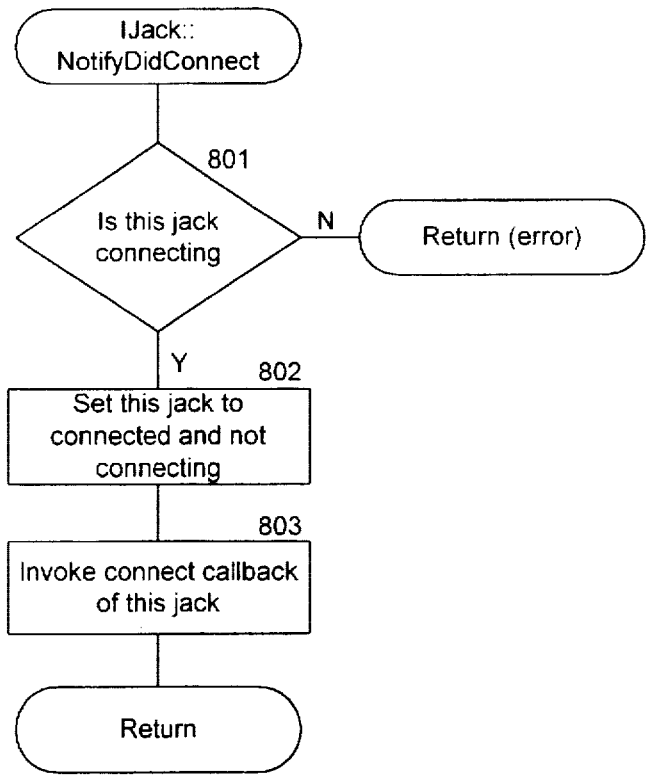
FIG. 8 is a flow diagram of the method NotifyDidConnect of the IJack interface.

FIG. 8 is a flow diagram of the method NotifyDidConnect of the IJack interface. This method notifies the user component of the connection. In step 801, if this jack is not connecting, the method returns an error. In step 802, the method sets this jack to indicate connected and not connecting. In step 803, the method invokes the connect callback of the user component as indicated by the descriptor entry of this jack and returns.

Figure 9:
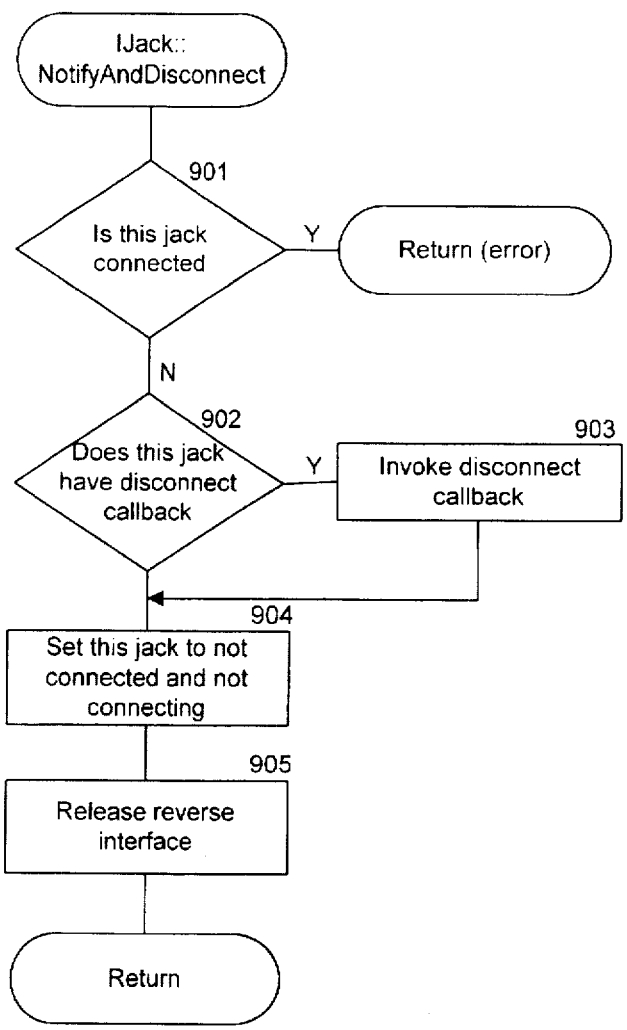
FIG. 9 is a flow diagram of the method NotifyAndDisconnect of the IJack interface.

FIG. 9 is a flow diagram of the method NotifyAndDisconnect of the IJack interface. In step 901, if this jack is not connected, then the method returns an error. In step 902, if the user component is to be notified of the disconnect, then the method invokes the disconnect callback in step 903. In step 904, the method sets this jack to indicate not connected and not connecting. In step 905, the method releases the plug interface and returns.

Figure 10:
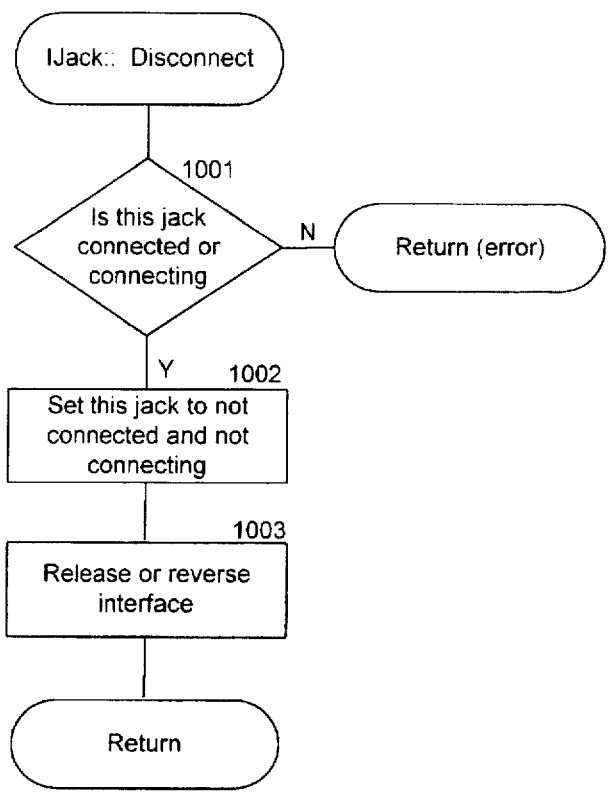
FIG. 10 is a flow diagram of the method Disconnect of the IJack interface.

FIG. 10 is a flow diagram of the method Disconnect of the IJack interface. In step 1001, if this jack is not connected or connecting, then the method returns an error. In step 1002, the method sets this jack to indicate not connected and not connecting. In step 1003, the method releases the plug interface and returns.

Figure 11:
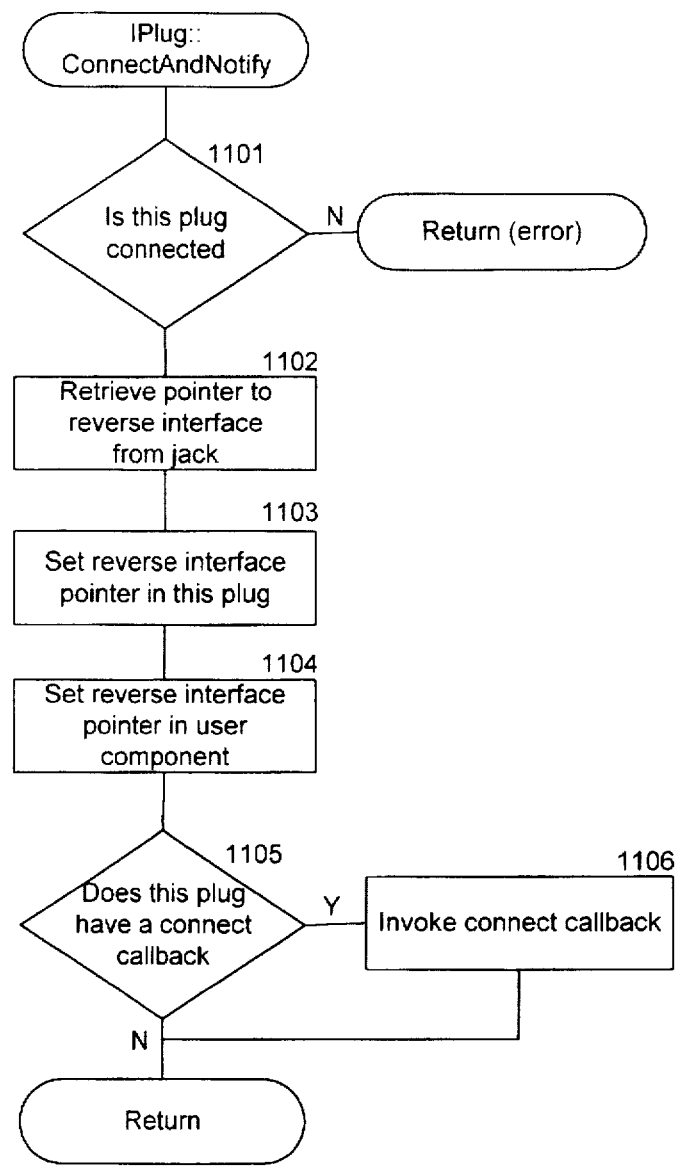
FIG. 11 is a flow diagram of the method ConnectAndNotify of the IPlug interface.

FIG. 11 is a flow diagram of the method ConnectAndNotify of the IPlug interface. In step 1101, if this plug is already connected, then the method returns an error. In step 1102, the method retrieves a pointer to the connected to jack interface. In step 1103, the method sets the reverse interface pointer in this plug to point to the jack interface. In step 1104, the method sets the reverse interface pointer of the user component to point to the jack interface. In step 1105, if the user component is to be notified of the connection, then the method invokes the connect callback of this plug in step 1106. The method then returns.

Figure 12:
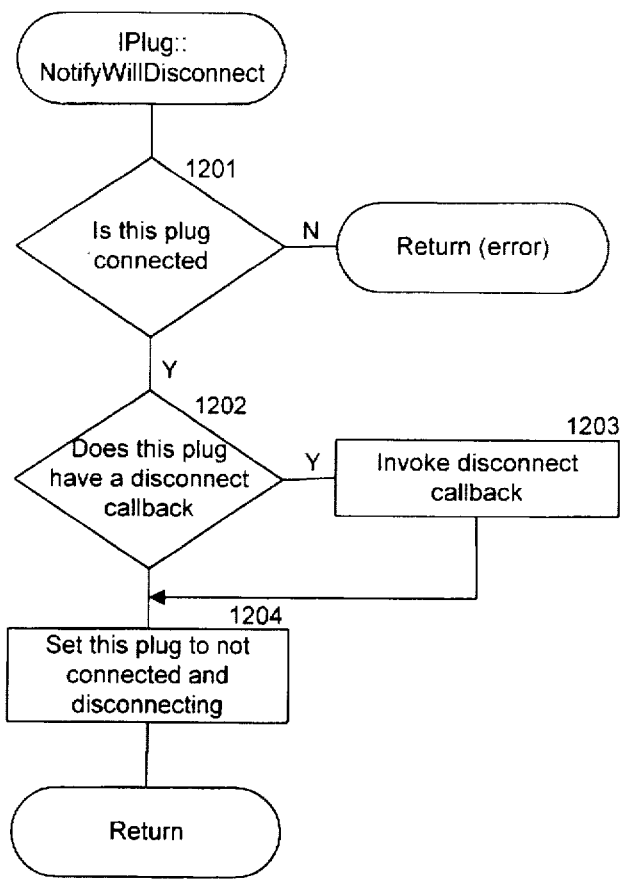
FIG. 12 is a flow diagram of the method NotifyWillDisconnect of the IPlug interface.

FIG. 12 is a flow diagram of the method NotifyWillDisconnect of the IPlug interface. In step 1201, if this plug is not connected, then the method returns an error. In step 1202, if the user component is to be notified of the disconnect, then the method invokes the disconnect callback in step 1203. In step 1204, the method sets this plug to indicate not connected and disconnecting and returns.

Figure 13:
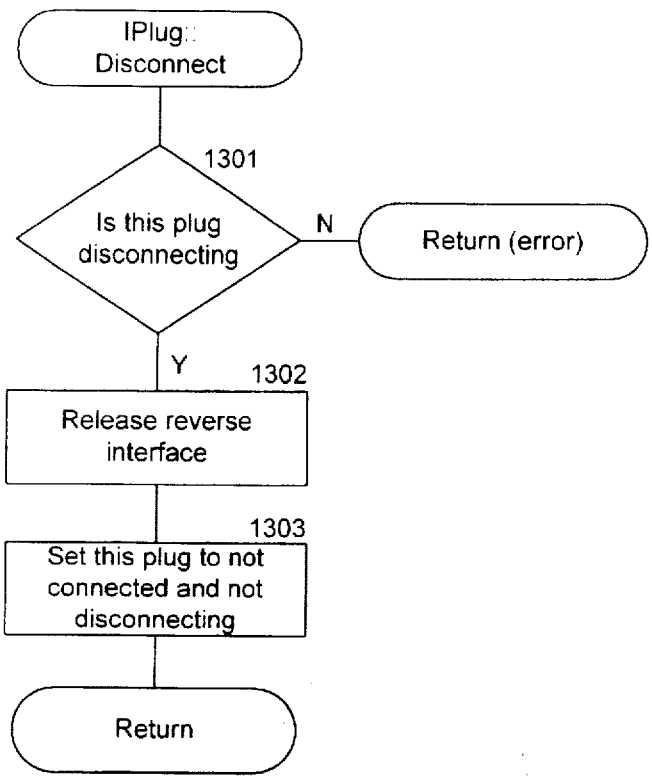
FIG. 13 is a flow diagram of the method Disconnect of the IPlug interface.

FIG. 13 is a flow diagram of the method Disconnect of the IPlug interface. In step 1301, if this plug is not disconnecting, then the method returns an error. In step 1302, the method releases the jack interface. In step 1303, the method sets this plug to indicate not connected and not disconnecting and then returns.

CODE TABLE 4

```
class IComponentJack: IUnknown
{
    STDMETHOD EnumerateDescriptors(
        IEnumDescriptor FAR *FAR *ppIEnumDesc,
        ULONG flag,
        REFIID iid,
        LPCTSTR lpszName)=0;
    STDMETHOD EnumerateConnectors(
        IEnumConnector FAR *FAR *ppIEnumConn,
        REFIID DescID,
        LPCTSTR lpszName)=0;
    STDMETHOD NewConnector(
        REFIID DescID,
        LPCTSTR lpszName,
        IConnector FAR *FAR *ppIConnector)=0;
    STDMETHOD DeleteConnector(IConnector FAR *pIConnector)=0;
};
```

The component manager provides various interfaces for use in managing connections between components. Code Table 4 contains a description of the IComponentJack interface. The interface defines four methods. The first two methods EnumerateDescriptors and EnumerateConnectors provide a mechanism for enumerating the connector descriptors and connectors. The methods return a pointer to an enumerator interface. The enumerator interface has a method Next that can be used to retrieve the connector descriptors or connectors serially. The method EnumerateDescriptors provides for the enumeration of each connector descriptor. The method is passed an interface id, an instance name, and a flag. The method returns a pointer to an enumerator for all connector descriptors or for only those connector descriptors that match the interface id or instance name based on the passed flag. The method EnumerateConnectors provides for the enumeration of each extruded connector of a specified connector descriptor. The method is passed an interface id and an instance name to specify a connector descriptor and returns a pointer to an enumerator.

Figure 14:
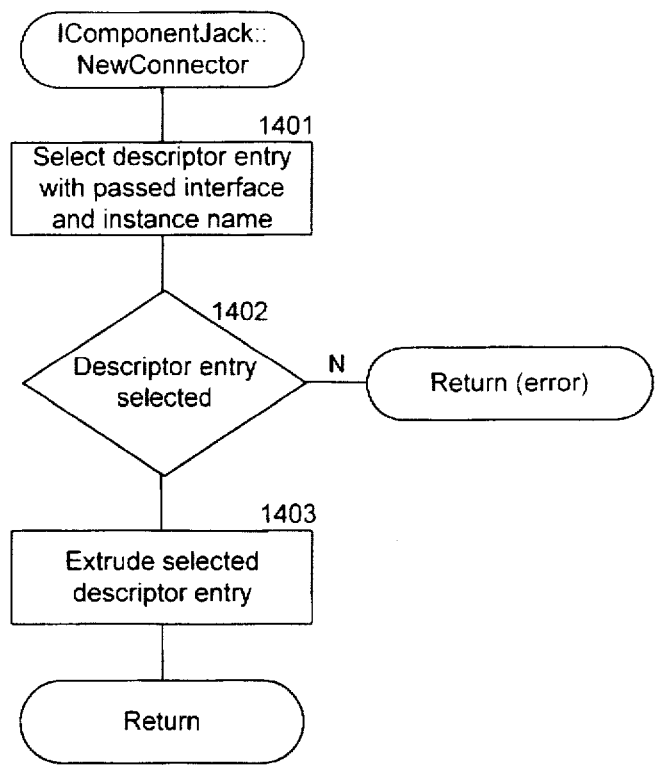
FIG. 14 is a flow diagram of the method NewConnector of the IComponentJack interface.

The method NewConnector of the IComponentJack interface extrudes a connector for the specified connector descriptor and returns a pointer to the connector. The method is passed an interface id (DescIID) and an instance name of a connector descriptor (lpszName). FIG. 14 is a flow diagram of the method NewConnector of the IComponentJack interface. In step 1401, the method selects a descriptor entry corresponding to the passed interface id and instance name. In step 1402, if no descriptor entry is selected, then the method returns an error. In step 1403, the method extrudes a connector entry for selected descriptor entry and returns. The method invokes the method Extrude of the selected descriptor entry. The method DeleteConnector of the IComponentJack interface functions in an analogous manner to remove an extruded connector. In a preferred embodiment, a descriptor entry contains state information including a pointer to the connector descriptors, the maximum number of connectors that can be extruded for this descriptor entry, the number of connectors currently extruded, a pointer to the CEList, connection id generator to help in generating unique identifiers for its connectors, and a flag field to maintain the state of the descriptor entry. As described below, the state of a descriptor entry can be private, projection, or projected.

CODE TABLE 5

```
class IDescriptorEntry: IUnknown
{
    ConnectorEntry FAR * Extrude(
        IComponent FAR * pICManifesting,
        ULONG CEflag,
        IUnknown FAR * pComponent,
        IConnector FAR *FAR * ppIConnector)=0;
};
```

Figure 15:
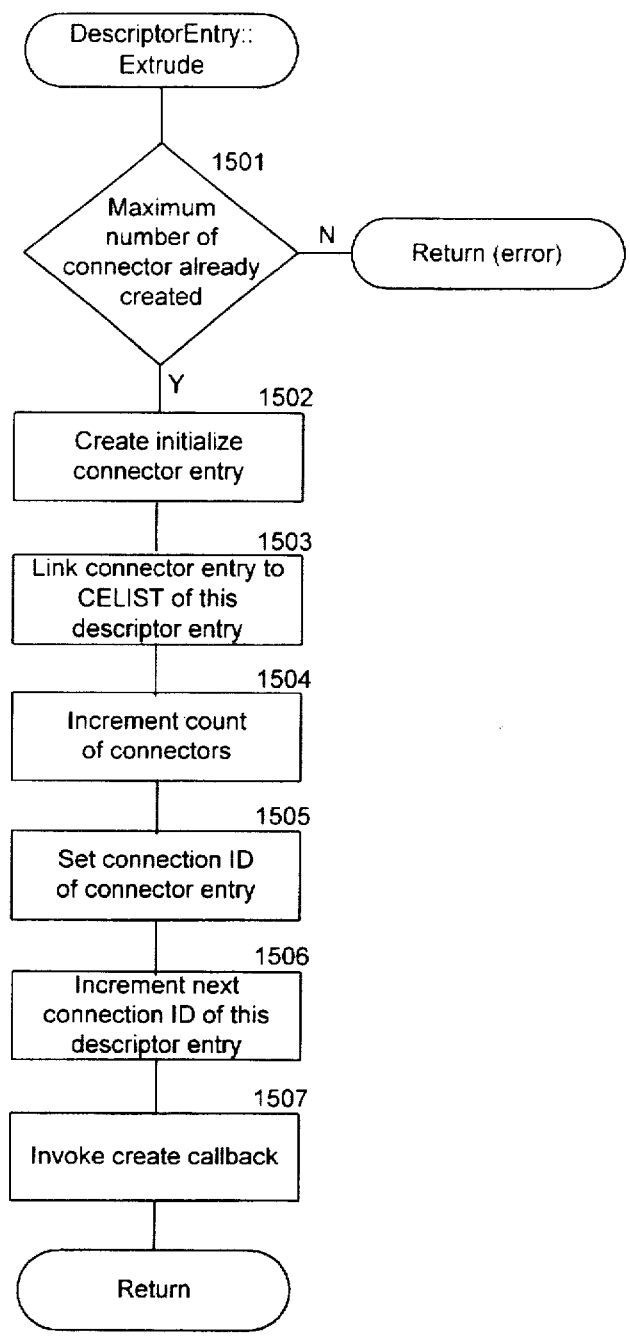
FIG. 15 is a flow diagram of the method Extrude of the IDescriptorEntry interface.

Code Table 5 contains a description of the IDescriptorEntry interface. The interface defines the method Extrude that returns a pointer to a newly created connector entry. The method is passed a pointer to a manifesting component (pICManifesting) (described below), a flag (CEflag), and a pointer to the user component (pComponent) and returns a pointer to newly created connector (ppIConnector). FIG. 15 is a flow diagram of the method Extrude of the IDescriptorEntry interface. In step 1501, if the maximum number of connectors for the connector descriptor has already been extruded, then the method returns an error. In step 1502, the method creates and initializes a connector entry. In step 1503, the method links the connector entry into the CEList of this descriptor entry. In step 1504, the method increments the number of connectors extruded for this descriptor entry. In step 1505, the method sets the connection id of the connector entry. Each connector entry for a descriptor entry has a unique connection id. In step 1506, the method increments the connection id generator of this descriptor entry. The connection id generator provides a unique connection id. In step 1507, the method invokes the create callback of the user component indicated by the connector descriptor passing a pointer to the user component and returns. The create callback returns a pointer to the interface of the protocol that is provided by the user component. In a preferred embodiment, a connector entry contains a unique connection id for the descriptor entry, a pointer to the interface provided by the user component, a reverse interface pointer, a pointer to a moniker of the mate connector, a pointer to the manifesting component, and a flag containing state information. The state information indicates whether the connector is connected, connecting, or disconnecting and whether the mate is a stub (described below).

A preferred embodiment provides for "lazy binding" to reverse interfaces. When a connection is established with lazy binding, the reverse interface pointers of the connector and the user component are set to point to a stub for the reverse interface, and not to the "real" reverse interface provided by the connected to component. The stub is a different implementation of the reverse interface. When any one of the methods of the stub is invoked, the method binds to the reverse interface and replaces the reverse interface pointers of the connector and the user component with a pointer to the bound reverse interface. Each method then invokes the corresponding method of the reverse interface. In this way, the binding to a reverse interface can be delayed until the reverse interface is actually referenced by a user component. Each connector descriptor preferably contains a pointer to a class factory to create the reverse interface stub. Each stub method, although implemented by a user component author, invokes predefined functions to retrieve information from the connector needed to bind to the reverse interface. Thus, the user component author does not need to know the internals of the component manager structure. If a stub class factory is not specified in a connector descriptor, then no lazy binding occurs.

Figure 16:
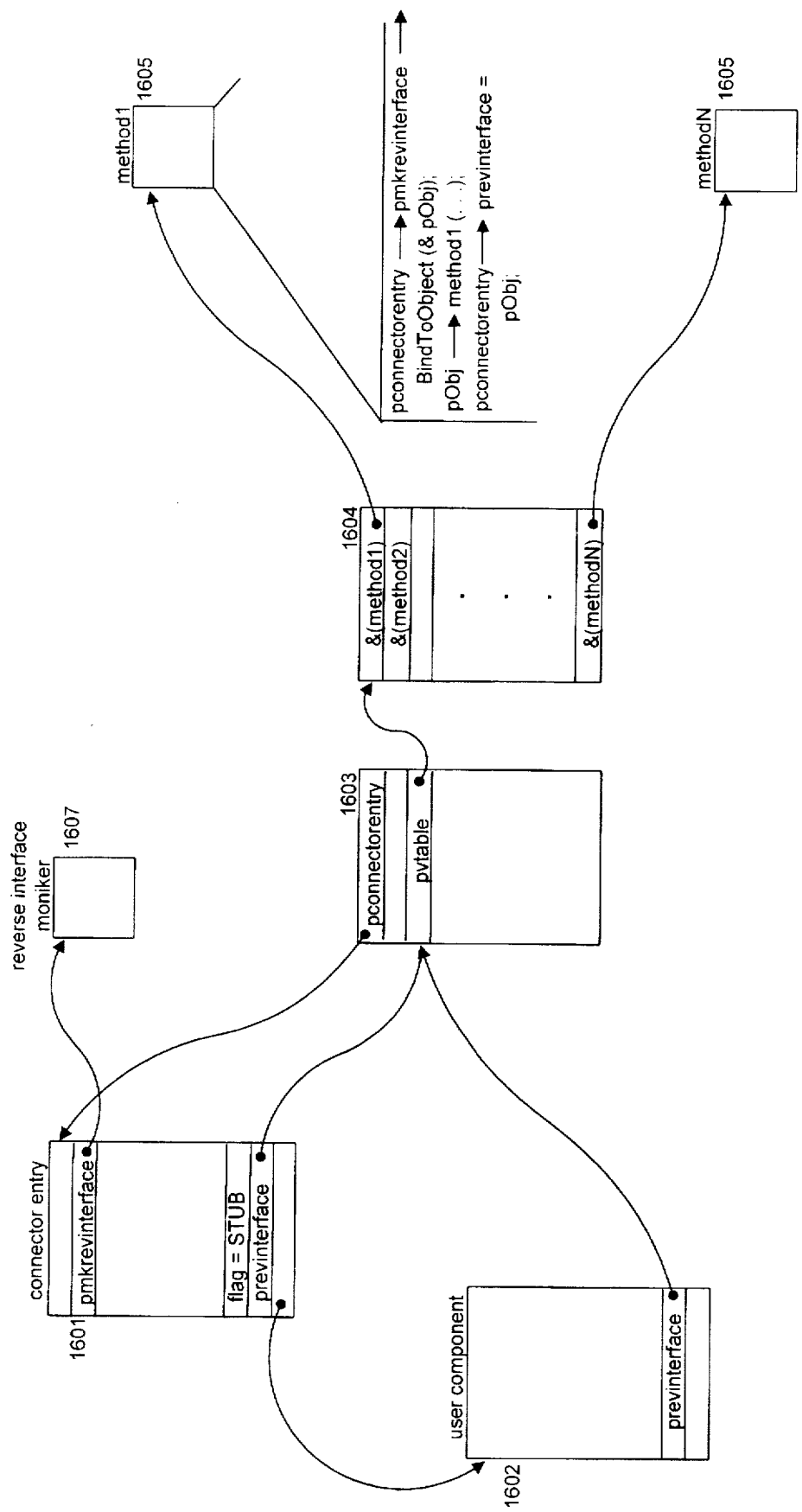
FIG. 16 is a block diagram illustrating lazy binding.

FIG. 16 is a block diagram illustrating lazy binding. When a connector entry is first extruded, the connector entry is set to point to a stub for the reverse interface. The stub provides a lazy binding implementation of the reverse interface. When a method of the stub is invoked, the method binds to the reverse interface indicated by the reverse interface moniker (described below) of the connector and then invokes the corresponding method of that bound interface. In FIG. 16, the reverse interface pointer (previnterface) of the connector entry 1601 points to the stub 1603. Also, the reverse interface pointer of the user component 1602 points to the stub 1603. The stub 1603 contains internal information, including a pointer to connector entry 1601. The virtual function table 1604 points to each stub method 1605. When a connection is established, the connector entry 1601 is set to point to a reverse interface moniker 1607. When the user component accesses a method through the reverse interface pointer, a stub method is invoked. As illustrated by the pseudocode of method1 1605, each stub method binds to the reverse interface identified by the reverse interface moniker, sets the reverse interface pointers to point to the bound reverse interface, invokes the corresponding method of the bound reverse interface, and then returns.

To implement lazy binding, each component is assigned a component moniker that uniquely identifies the component. Each connector generates a connector moniker that uniquely defines the connector within the component. The connector moniker contains the interface id, instance name, and connection id to provide the unique identification. The method GetMoniker (described below) of the IConnector interface returns a connector moniker for the connector. When a connection is established, each connector is provided with a connector moniker for the reverse interface (monikers are described in detail in U.S. patent application Ser. No. 07/08/088,724, entitled "METHOD AND SYSTEM FOR NAMING AND BINDING OBJECTS," filed Jul. 6, 1993, now U.S. Pat. No. 5,581,760, which is hereby incorporated by reference). When binding through a reverse interface stub, the method BindToObject of the reverse interface moniker is invoked.

In a preferred embodiment, connections may be designated as persistent or nonpersistent in the connector descriptor. A nonpersistent connector is deallocated when all references to it go away (e.g. reference count equals 0). A persistent connector, on the other hand, is not deallocated when all references to it go away. When a persistent connector is connected, a moniker identifying the reverse interface is stored in the connector. The methods of the reverse interface stub use this moniker to bind to the reverse interface. When a nonpersistent connector is connected, then the reverse interface is bound at that time and the reverse interface pointers are set to point to the real reverse interface.

An embodiment of the present invention provides for multicasting a message to all components connected through a protocol. A message is multicasted by invoking a method of each connected connector for a specified connector descriptor. The function GetMulticastStub returns a pointer to a multicast stub implementation of the reverse interface. The function is passed an interface id and instance name and returns a pointer to the multicast stub. To multicast a message, the user component invokes a method of the multicast stub. Each method of the multicast stub invokes the corresponding method of the reverse interface of each connected connector. FIG. 17 is a block diagram illustrating a preferred implementation of the multicast interface stub. The descriptor entry 1701 points to connector entries 1702–1703. Connector entry 1702 is connected but is not yet bound; connector entry 1702 points to the lazy binding stub 1704 as its reverse interface pointer. Connector entry 1703 is bound and points to the reverse interface 1705. The multicast stub 1706 points to the descriptor entry 1701. Each method of the multicast stub 1706 is pointed to through the virtual function table 1707. Each method of the multicast stub 1708 loops through the connector entry list and if a connector entry is connected, the method invokes the corresponding method of the reverse interface. The multicasting of a message is logically equivalent to enumerating each connector and invoking a method of the reverse interface. A method that returns a parameter cannot be multicast through this mechanism.

Figure 17A:
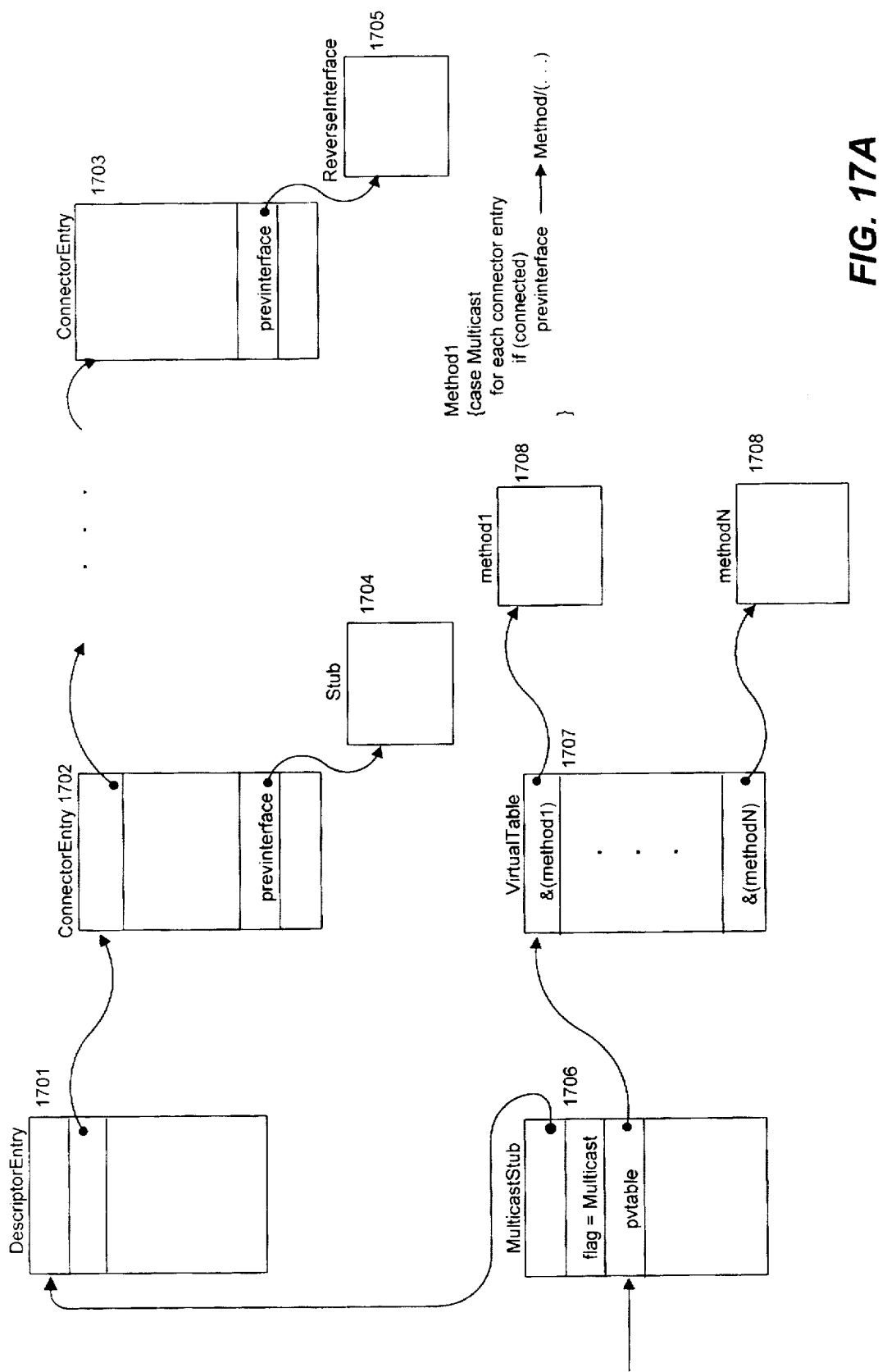
FIG. 17A is a block diagram illustrating a preferred implementation of the multicast interface stub.
Figure 17B:
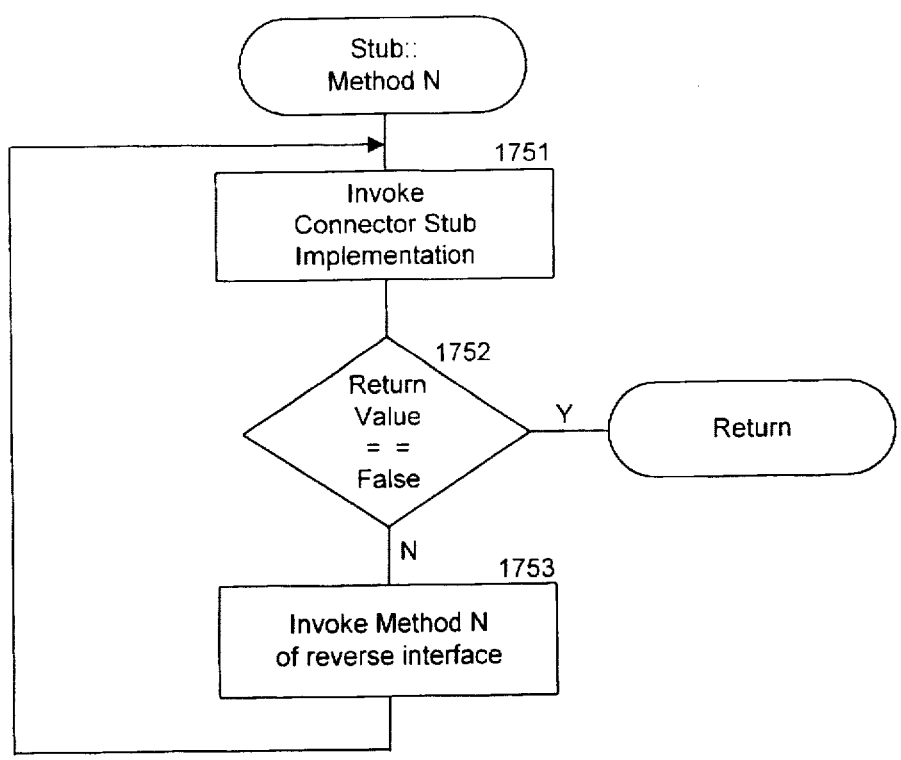
FIG. 17B is a flow diagram illustrating a sample method of a stub.

FIG. 17A is a flow diagram illustrating a sample method of a stub. The reverse interface stub and a multicast stub share the same implementation. The stub method loops invoking the function ConnectorStubImplementation provided by the component manager. That function returns a pointer to a reverse interface. The stub method invokes the corresponding method of the reverse interface. When the function returns a return value of false, then the stub method return. When multicasting, the stub method loops receiving reverse interface pointers. When not multicasting, only one reverse interface pointer is returned. In step 1751, the method invokes the function ConnectorStubImplementation which returns a reverse interface pointer and a return value. In step 1752, if the return value is false, then the method returns. In step 1753, the method invokes the corresponding method of the reverse interface and loops to step 1751. The function ConnectorStubImplementation determines whether it is being invoked by a reverse interface stub or a multicast stub by internal information stored in the stub.

CODE TABLE 6

```
class IConnector: IUnknown
{
    STDMETHOD GetMoniker(IMoniker FAR *FAR *ppmkr)=0;
    STDMETHOD GetOwner(IComponent FAR *FAR *ppIC)=0;
    STDMETHOD IsConnected()=0;
    STDMETHOD GetInfo(IID FAR *piid, LPTSTR FAR *ppiname,
        IID FAR *piidm, ULONG FAR *pCDflag)=0;
    STDMETHOD ReleaseMate()=0;
    STMETHOD SetMateConnector(IUnknown FAR *pIUnk)=0;
    STDMETHOD GetMateConnector
        (IUnknown FAR *FAR *ppIUnk)=0;
    STDMETHOD Passivate()=0;
    STDMETHOD Bindstub()=0;
}
```

Code Table 6 contains a description of the IConnector interface. Each connector entry provides this interface to manipulate the connection. The method GetMoniker returns the moniker for this connector. The method instantiates a connector moniker and sets data members to the interface id, instance name, and connection id of this connector. The method then composes the connector moniker with the component moniker for the manifesting component and returns. The manifesting component is the component that extrudes this connector. The method GetOwner returns a pointer to the manifesting component of this connector. The method IsConnected returns the value true if this connector is currently connected. The method GetInfo gathers and returns the interface identifier, the reverse interface id, the instance name, and a status flag of this connector. The method ReleaseMate invokes the method release of the reverse interface and creates a reverse interface stub. The method SetMateConnector sets the reverse interface pointer of this connector and the user component to the passed interface. The method sets this connector to the connected. The method GetMateConnector binds to the stub if not already bound and returns the pointer to the reverse interface.

Figure 18:
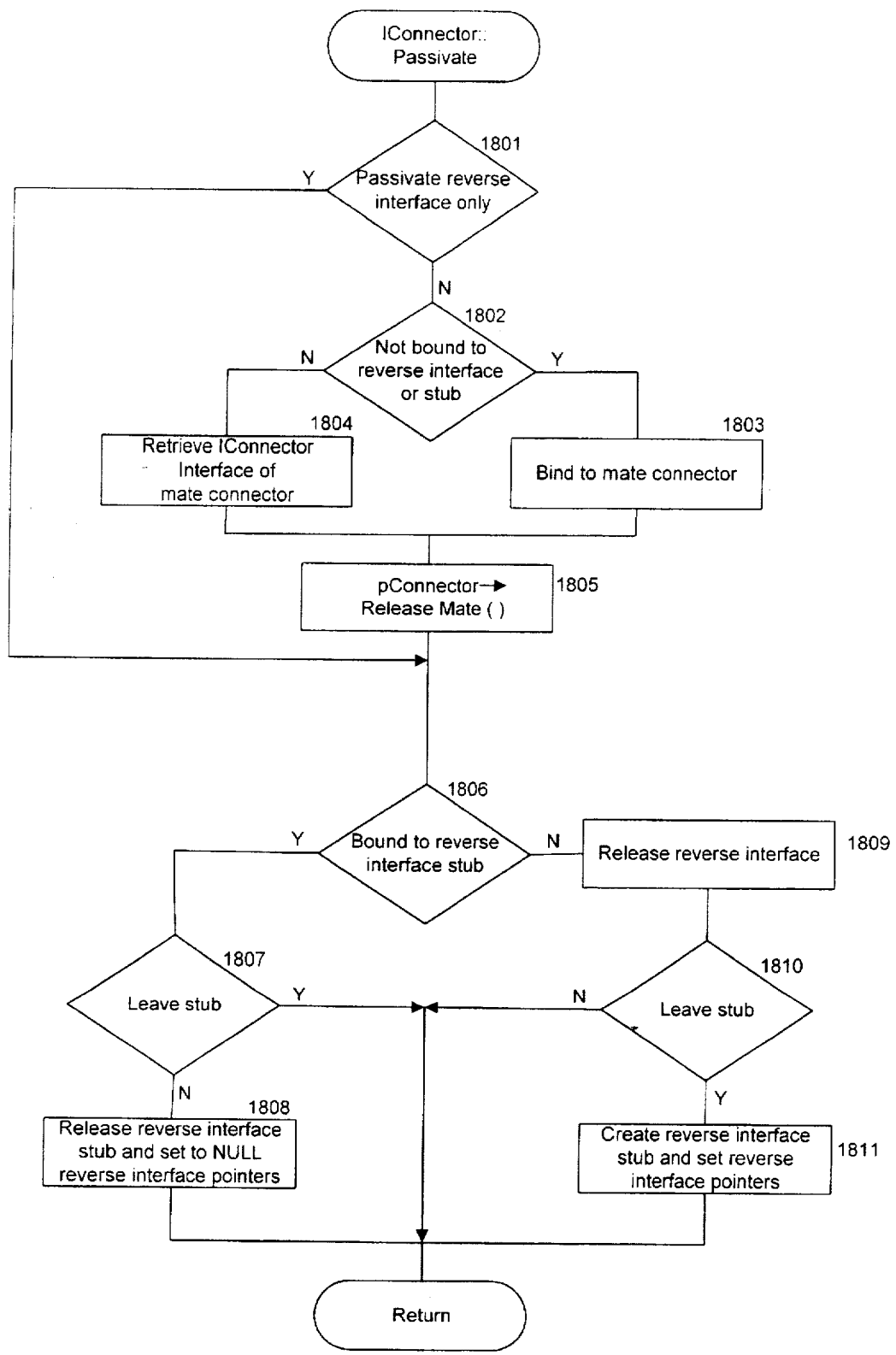
FIG. 18 is a flow diagram of the method Passivate of the IConnector interface.

The component manager provides a mechanism to passivate (unbind) a connection. Either the interface or the reverse interface of a connection can be passivated. A connector is passivated by releasing the reverse interface (if not a reverse interface stub) and replacing it with a reverse interface stub. The reverse connector is passivated by invoking the method ReleaseMate of the IConnector interface. A connection is passivated by the method Passivate of the IConnector interface. The method is passed an indication as to whether a reverse interface stub should be left and whether the mate connector should be passivated also. FIG. 18 is a flow diagram of the method Passivate of the IConnector interface. In step 1801, if the passed flag indicates to passivate only the connection to the reverse interface, then the method continues at step 1806, else the method continues at step 1802. In step 1802, if this connector is not bound to the reverse interface or is bound to a reverse interface stub, then the method continues at step 1803, else the method continues at step 1804. In step 1803, the method binds to the reverse interface and retrieves a pointer to the IConnector interface of the mate connector. In step 1804, the method retrieves a pointer to the IConnector interface of the mate connector. In step 1805, the method invokes the method ReleaseMate of the mate connector to request the mate connector to release the interface provided by this connector. In step 1806, if this connector is bound to a reverse interface stub, then the method continues at step 1807, else the method continues at step 1809. In step 1807, if the passed flag indicates to leave a reverse interface stub, then the method returns. In step 1808, the method releases the reverse interface stub and sets the reverse interface pointers to NULL and returns. In step 1809, the method releases the reverse interface by invoking the method Release. In step 1810, if the passed flag indicates to not leave a stub, then the method returns. In step 1811, the method creates a reverse interface stub, sets the reverse interface pointers, and returns.

Figure 19:
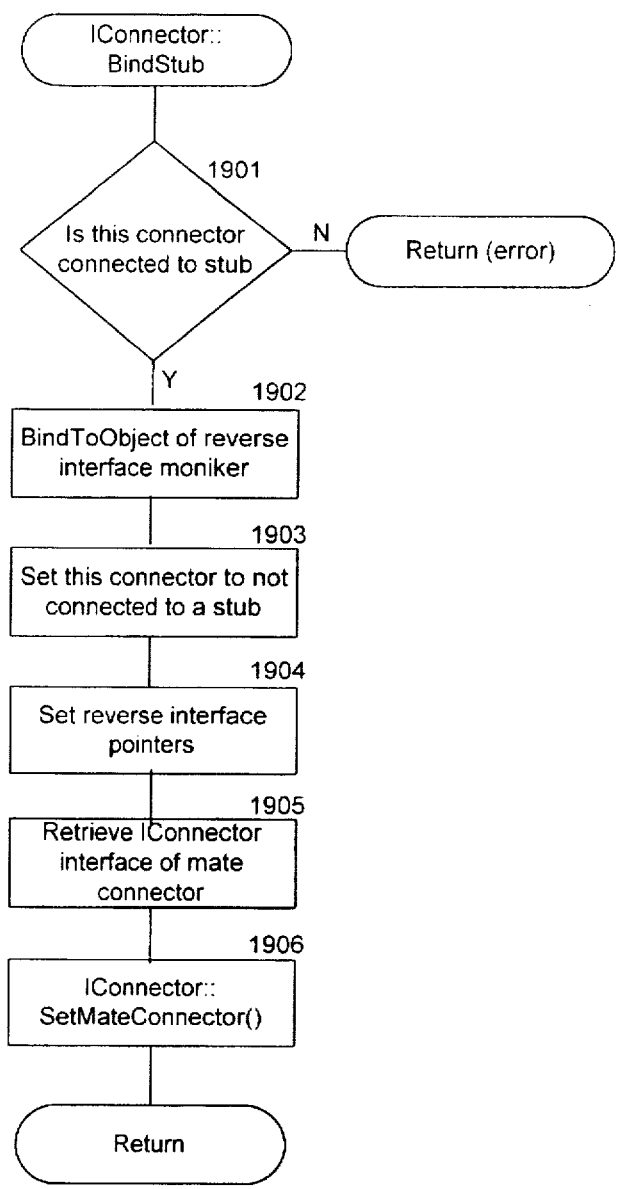
FIG. 19 is a flow diagram of the method BindStub of the IConnector interface.

The inverse of passivating a connection is binding to a connection. FIG. 19 is a flow diagram of the method BindStub of the IConnector interface. In step 1901, if this connector is not connected to a stub, then the method returns an error. In step 1902, the method binds to the reverse interface by invoking the method BindToObject of the reverse interface moniker. In step 1903, the method sets this connector to indicate that it is not connected to a stub. In step 1904, the method sets the reverse interface pointers to point to the bound to reverse interface. In steps 1905 and 1906, the method optionally connects the mate connector and sets its reverse interface pointers. In step 1905, the method retrieves the IConnector interface of the mate connector. In step 1906, the method sets the reverse interface pointers of the mate connector to point to the interface provided by this connector and returns. The IConnect interface provides the method SetMateConnector that is passed a pointer to a reverse interface, sets the connector to connected, and sets the reverse interface pointers.

Figure 20:
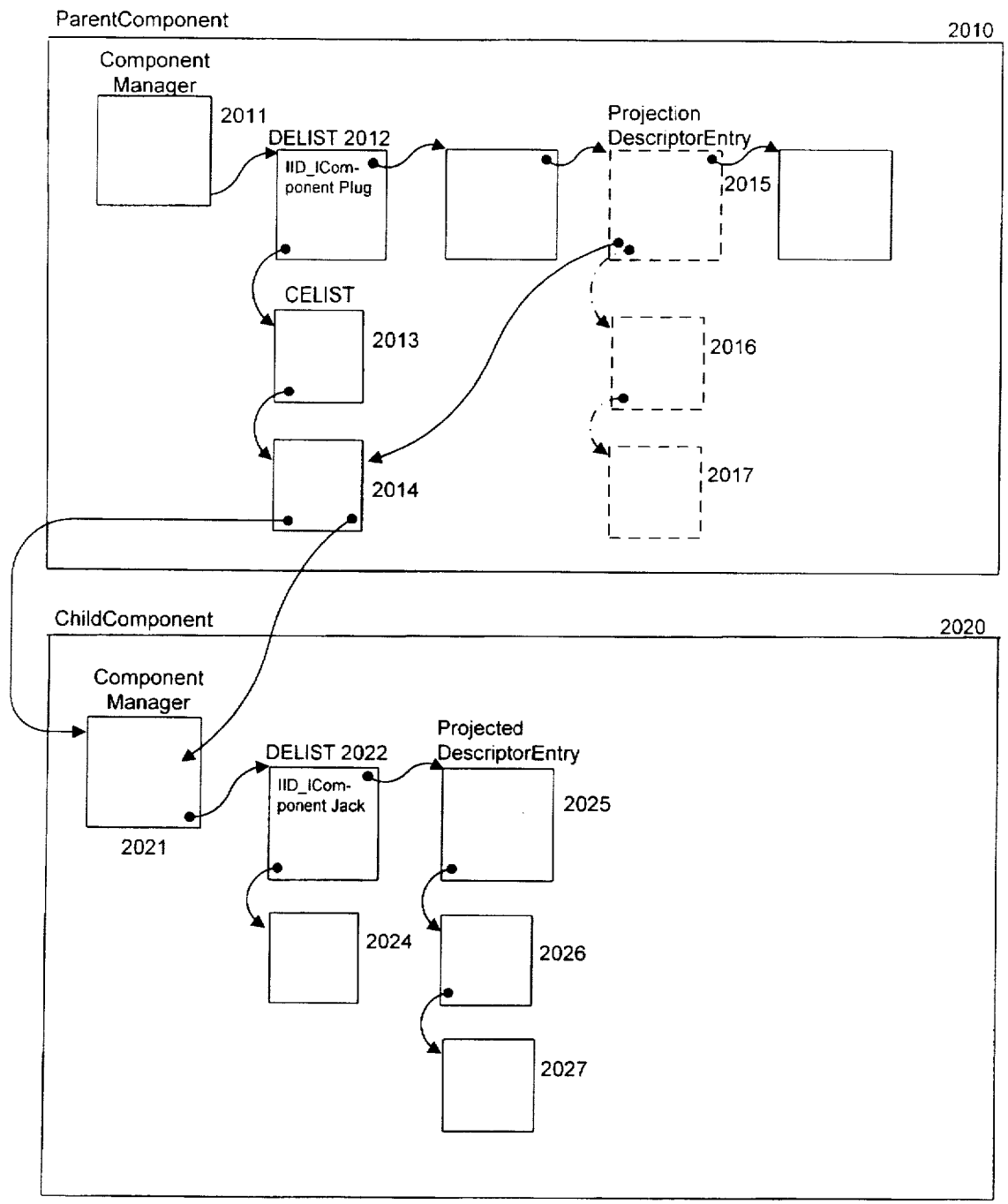
FIG. 20 is a block diagram illustrating a parent component and a child component.

A preferred embodiment of the present invention allows components to be embedded within a container component. The embedded component is a child component (child), and the container component is a parent component (parent). The connector descriptors of the child components can be "projected" onto the parent component. To a user of the parent component, a projected connector descriptor appears as just another connector of the parent component. FIG. 20 is a block diagram illustrating a parent component and a child component. A parent is connected to its children through the IComponentPlug/IComponentJack protocol (parent/child protocol). Each component that is a parent has a connector descriptor specifying the IComponentPlug interface and the IComponentJack reverse interface. Thus, the connector descriptor array includes an entry for the IComponentPlug/IComponentJack protocol for each component that can be a parent component. Each component is automatically created with a connector descriptor for the IComponentJack interface and IComponentPlug reverse interface. In this way, any components can be embedded within a parent. The CEList for the descriptor entry for the parent/child protocol contains a connector for each child. FIG. 20 shows a parent component 2010 and a child 2020. The parent 2010 comprises component manager 2011 and a DEList with descriptor entries 2012 and 2015. Descriptor entry 2012 supports the parent/child protocol. The CEList of descriptor entry 2012 contains connectors 2013 and 2014. The connector 2014 is connected to child 2020. The child 2020 comprises component manager 2021 and a DEList with descriptor entries 2022 and 2025. Descriptor entry 2022 supports the parent/child protocol. The connector 2024 connects to the parent 2010. Descriptor entry 2015 is a projection of descriptor entry 2025 of the child onto the parent. When a descriptor entry is projected from a child onto a parent, a new descriptor entry is added to the parent with an indication that it is a projection. The projected descriptor entry of the child is set to indicate that it is projected. When a connector is extruded from a projection descriptor entry, a connector 2016 is created for the parent. However, as indicated by the dashed lines, a projection connector entry does not provide an IConnector, IJack, or IPlug interface. Rather, when a connector is extruded from a projection descriptor entry, the IConnector interface of the child is returned. The parent invokes a method of the child so that the child can extrude a corresponding connector 2026. If the child is itself a parent and the extruded connector is a projection, then the child's child is invoked to extrude its connector. The parent and child relationships can be to an arbitrary level of nesting. When a projected connector is extruded, a pointer to projected connector is returned. Thus, connections are established directly to the connector of the child. The IComponentPlug/IComponentJack protocol is an unidirectional protocol. The parent does not provide an implementation of the IComponentPlug interface. Rather, as with any other unidirectional protocol, only the IUnknown interface is implemented. The IComponentJack interface is provided by the component manager as described above.

The function ComponentCreateChild creates a child component of the specified class for the specified parent and connects the child to the parent. The parent component should have a full path moniker, and the function sets the parent moniker and this moniker of the child. In a preferred embodiment, a component manager contains a fill path moniker, a parent moniker, and a this moniker. The parent moniker is a moniker that identifies the parent of a child. The this moniker is a moniker that identifies a child of the parent. If the component is not a child, then this moniker identifies the component. The full path moniker is the composition of the parent moniker with the this moniker. A preferred prototype of the function ComponentCreateChild is
STDAPI ComponentCreateChild(
    struct ComponentManager FAR *pComponentManager,
    DWORD dwClsContext,
    void FAR *preserved,
    REFCLSID rcid,
    IUnknown FAR * FAR * ppComponentPlug)

Figure 21A:
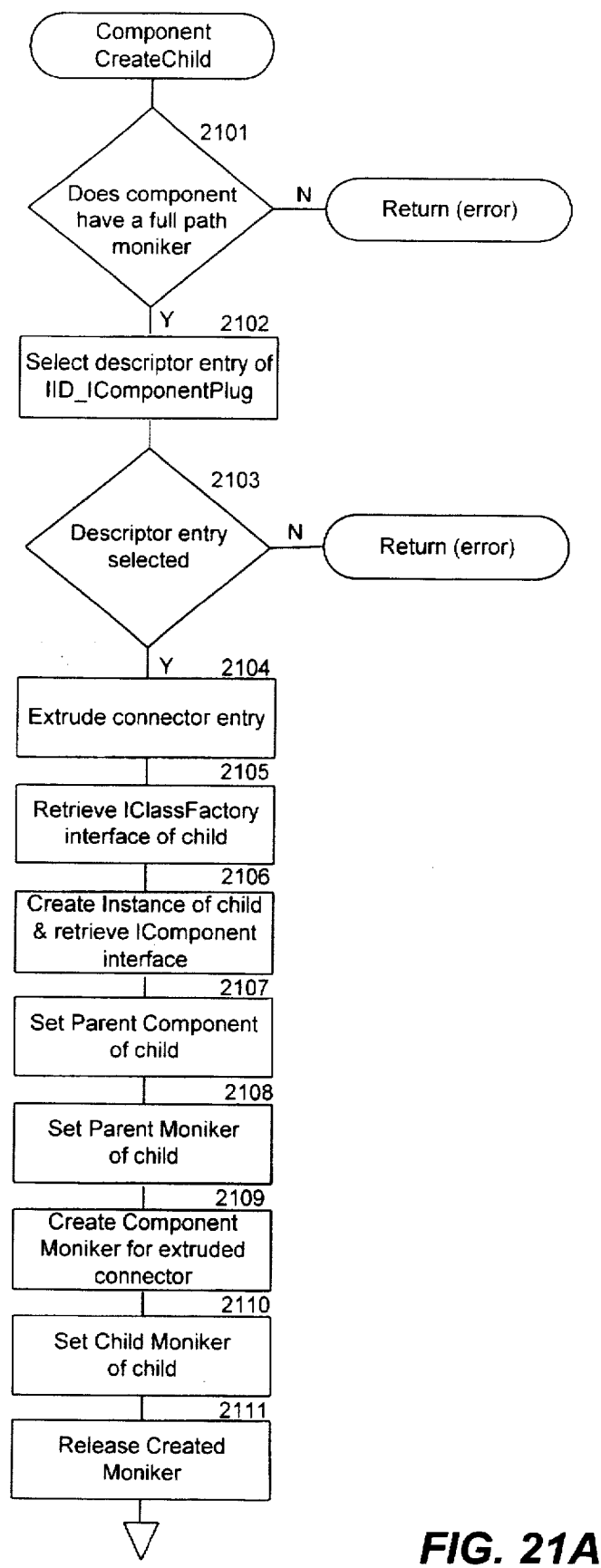
FIGS. 21A and 21B comprise a a flow diagram of the function ComponentCreateChild.
Figure 21B:
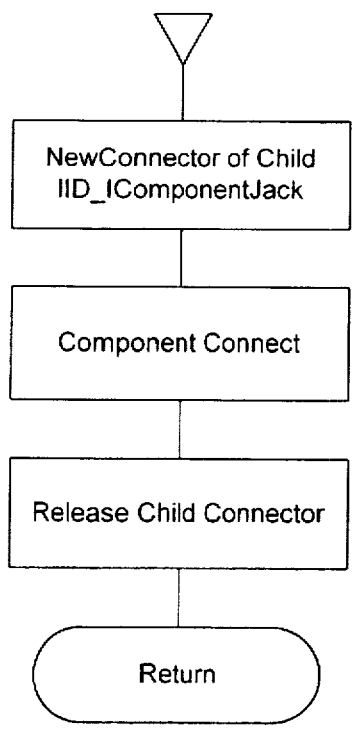

The parameter pComponentManager is a pointer to the parent component; the parameter dwClsContext and rcid represent the class id of the child. The function returns a pointer to the IComponentPlug interface provided by the parent. FIGS. 21A and 21B comprise a a flow diagram of the function ComponentCreateChild. In step 2101, if the parent component does not have a full path moniker, then the method returns an error. In step 2102, the method selects a descriptor entry of the parent component for the IComponentPlug interface. In step 2103, if the method does not select a descriptor entry, then the method returns an error. In step 2104, the method extrudes a connector from selected descriptor entry. This connector is used to connect to the child. In step 2105, the method retrieves the IClassFactory interface for the child as specified by the passed class id. In step 2106, the method creates an instance of the child and retrieves its IComponent interface. The methods of the IComponent interface are described below. In step 2107, the method sets the child component to point to its parent component by invoking the method SetParentComponent of the child. In step 2108, the method sets the parent moniker of the child by invoking the method SetParentMoniker of the child. In step 2109, the method creates a component moniker for the child. The component moniker contains the connection id of the extruded connector of the parent to uniquely identify the child within the parent. In step 2110, the method sets the this moniker of the child by invoking the method SetChildMoniker of the child. In step 2111, the method releases the created component moniker. In step 2112, the method extrudes a connector from the descriptor entry for the IComponentJack/IComponentPlug protocol of the child. In step 2113, the method invokes the function Component-Connect to connect the plug connector of the parent to the jack connector of the child. In step 2114, the method releases the jack connector of the child and returns.

Figure 22:
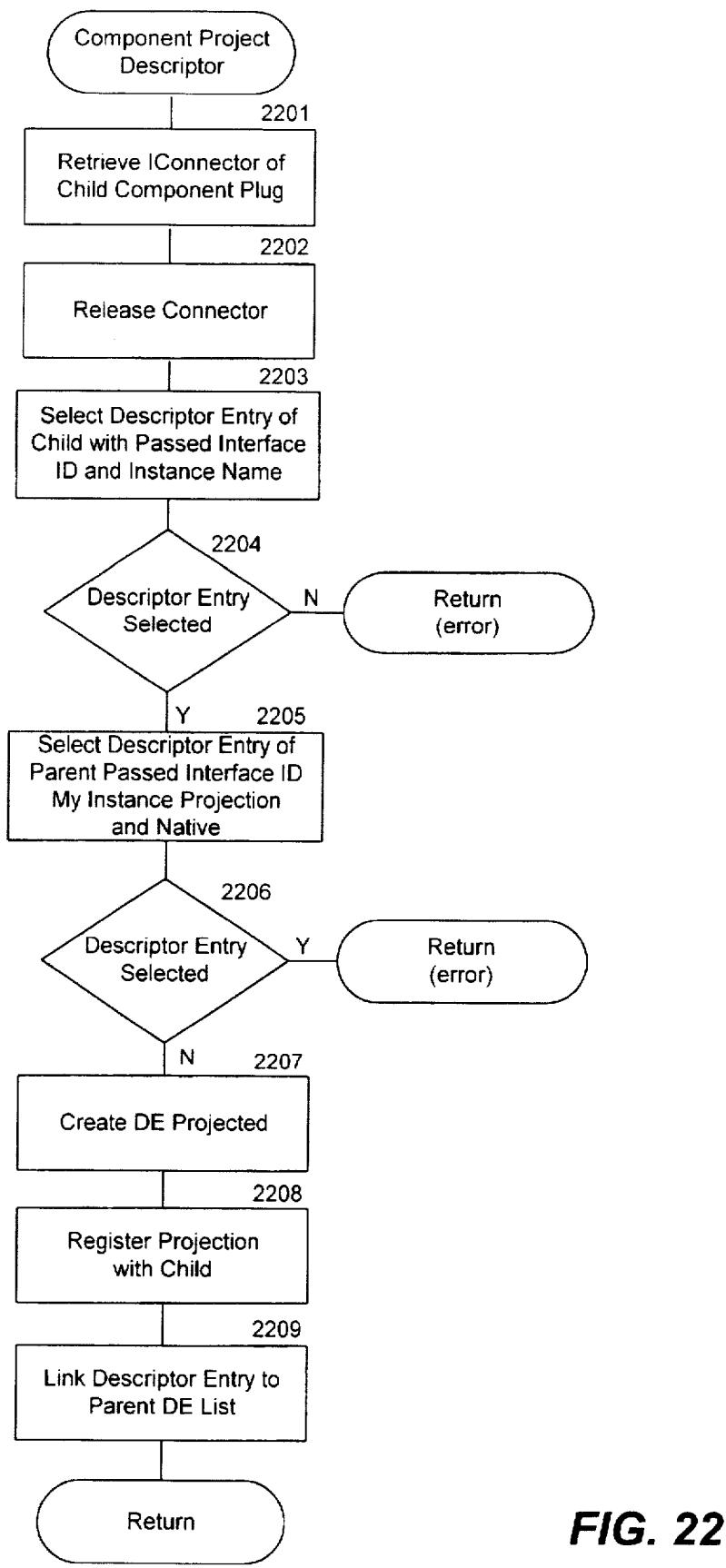
FIG. 22 is a flow diagram of the function ComponentProjectDescriptor.

The function ComponentProjectDescriptor projects a specified interface of a specified child component onto its parent component. The function creates a "projection" descriptor entry for the parent and links it into the DEList. The corresponding descriptor entry of the child is set to indicated that it is projected. The projection descriptor entry is set to the specified instance name. A preferred prototype for the function ComponentProjectDescriptor is
STDAPI ComponentProjectDescriptor(
    struct ComponentManager FAR *pComponentManager,
    IUnknown FAR *pChildIComponentPlug,
    REFIID riid,
    LPCTSTR child_iname,
    LPCTSTR my_iname,
    ULONG cMaxConnectors);

The parameter pComponentManager points to the parent component; the parameter pChildIComponentPlug points to the IComponentPlug interface provided by the parent, the parameters riid and child_iname specify the interface id and instance name of the child connector to project; the parameter my_name specifies the instance name for the projection descriptor entry; and the parameter cMaxConnectors specifies the maximum count of connectors for the projection descriptor entry. FIG. 22 is a flow diagram of the function ComponentProjectDescriptor. In step 2201, the method retrieves the IConnector interface of the child connector. In step 2202, the method releases the interface. In step 2203, the method selects a descriptor entry of the child with the passed interface id and instance name. In step 2204, if the method does not select a descriptor entry, then the method returns an error. In step 2205, the method selects a descriptor entry of the parent with the passed interface id and new instance name. In step 2206, if the method selected a descriptor entry, then the method returns an error. In step 2207, the method creates a projection connector entry for the parent. In step 2208, the method registers the projection with the child to indicate to the child that its descriptor entry is now projected. The method invokes the method RegisterProjection of the IComponent interface of the child. In step 2209, the method links the projection descriptor entry to the DEList of the parent and returns.

A connector is extruded from a projection descriptor entry in an analogous manner to a non-projection descriptor entry. However, the parent notifies the child that a connector is being extruded and a pointer to the IConnector interface of the child is returned. The parent invokes the method NewProjectedConnector of the IComponent interface of the child. This method extrudes a connector for the projected descriptor entry of the child. If projected descriptor entry is itself a projection descriptor entry, then the child's child is notified.

CODE TABLE 7

```
class IComponent:IUnknown
{
    void SetMoniker(IMoniker FAR *pmkr)=0;
    void GetMoniker(IMoniker FAR *FAR *ppmkr)=0;
    void SetParentComponent(IComponent FAR *pParentIC)=0;
    void SetParentMoniker(IMoniker FAR *pmkParent)=0;
    void SetChildMoniker(IMoniker FAR *pmkChild)=0;
    void PassivateConnections(ULONG flag)=0;
    void NewProjectedConnector(IComponent FAR *pICManifesting,
        REFIID DescIID, LPCTSTR lpszName,
        ULONG FAR *pconnid,
        IConnector FAR *FAR *ppIConnector)=0;
    void DeleteProjectedConnector(REFIID DescIID,
        LPCTSTR lpszName, ULONG connid)=0;
    void RegisterProjection(REFIID riid, LPCTSTR iname,
        ULONG FAR *pCDflag)=0;
    void RevokeProjection(REFIID riid, LPCTSTR iname)=0;
    void DoEagerBinds()=0;
};
```

Code Table 7 defines the IComponent interface that is provided by the component manager. The IComponent interface provides methods to manipulate components. Code Table 8 defines internal state information of the component manager. In the following, the methods of the IComponent interface are described.

CODE TABLE 8

```
class ComponentManager
{
    ULONG refcount;
    IUnknown FAR *PUnkOuter;
    IUnknown aggiu;
    IComponent FAR *pParent;
    DescriptorEntry FAR *pDEList;
    ULONG DErefcount;
    const ComponentDEscriptor FAR *pCompDesc;
```

CODE TABLE 8-continued

```
    IMoniker FAR *pmkr;
    IMoniker FAR *pmkThis;
    IMoniker FAR *pmkParent;
    IUnknown FAR *pComponent;
};
```

Figure 23:
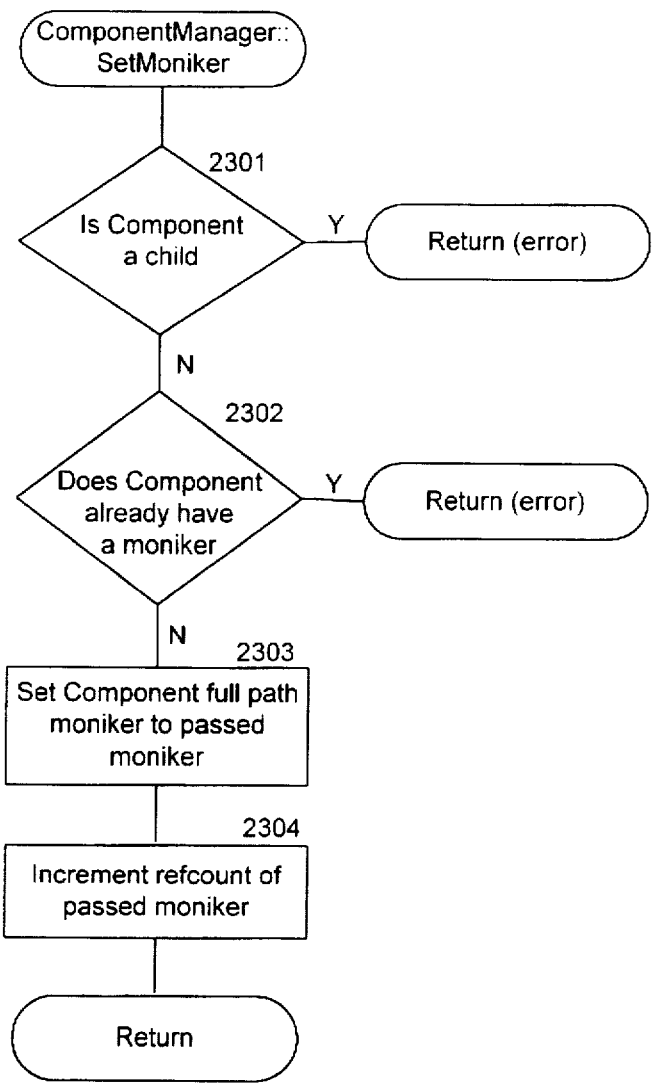
FIG. 23 is a flow diagram of the method SetMoniker of the IComponent interface.

FIG. 23 is a flow diagram of the method SetMoniker of the IComponent interface. The method SetMoniker is passed a pointer to a moniker and sets the full path moniker (pmkr) of this component to point to the passed moniker. In step 2301, if this component is a child component, then the method returns an error, else the method continues at step 2302. In step 2302, if this component already has a fill path moniker (pmkr!=NULL), then the method returns an error, else the method continues at step 2303. In step 2303, the method sets the full path moniker (pmkr) of this component to the passed moniker. In step 2304, the method increments the reference count of the passed moniker and returns.

Figure 24:
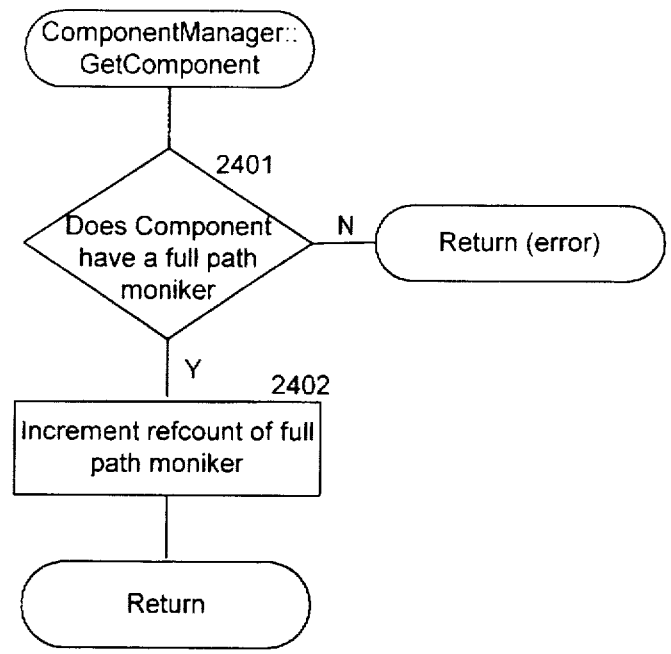
FIG. 24 is a flow diagram of the method GetMoniker of the class ComponentManager.

FIG. 24 is a flow diagram of the method GetMoniker of the class ComponentManager. The method GetMoniker returns a pointer to the full path moniker for this component. In step 2401, if this component does not have a full path moniker, then the method returns an error. In step 2402, the method increments the reference count of the fill path moniker and returns.

Figure 25:
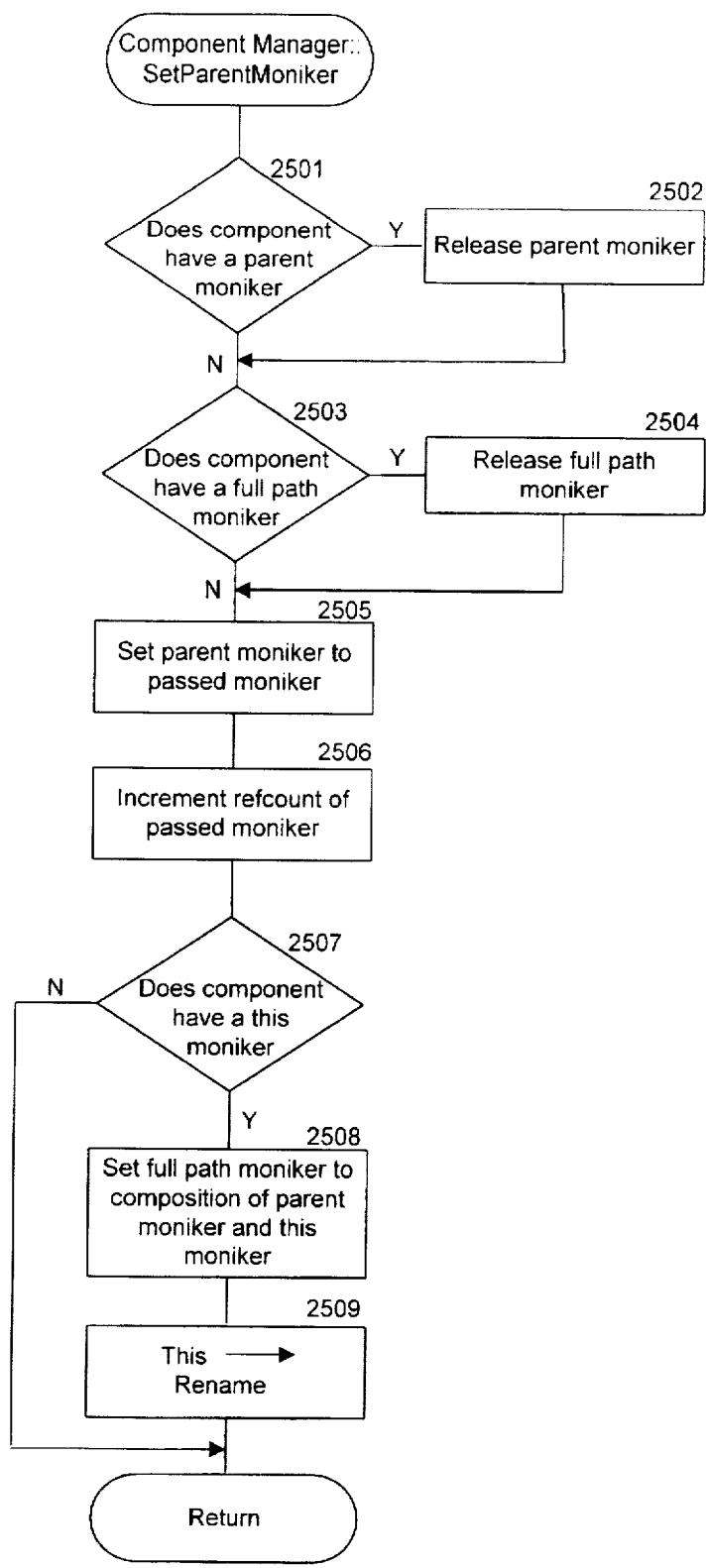
FIG. 25 is a flow diagram of the method SetParentMoniker of the class ComponentManager.

FIG. 25 is a flow diagram of the method SetParentMoniker of the class ComponentManager. This method sets the parent moniker for this component to the passed moniker. If the component currently has a parent moniker, then the method releases the current parent moniker. The method also sets the parent moniker of all child components. In step 2501, if this component has a parent moniker (pmkParent), then the method releases the parent moniker in step 2502. In step 2503, if the component has a full path moniker (pmkr), then the method releases the full path moniker in step 2504. In step 2505, the method sets the parent moniker of this component to the passed moniker. In step 2506, the method increments the reference count of the passed moniker. In step 2507, if the component does not have a this moniker (pmkThis), then the method returns. In step 2508, the method sets the full path moniker to the composition of the parent moniker and the this moniker by invoking the method ComposeWith of the parent moniker. In step 2509, the method invokes the method Rename to set the parent moniker of each child component and then returns.

Figure 26:
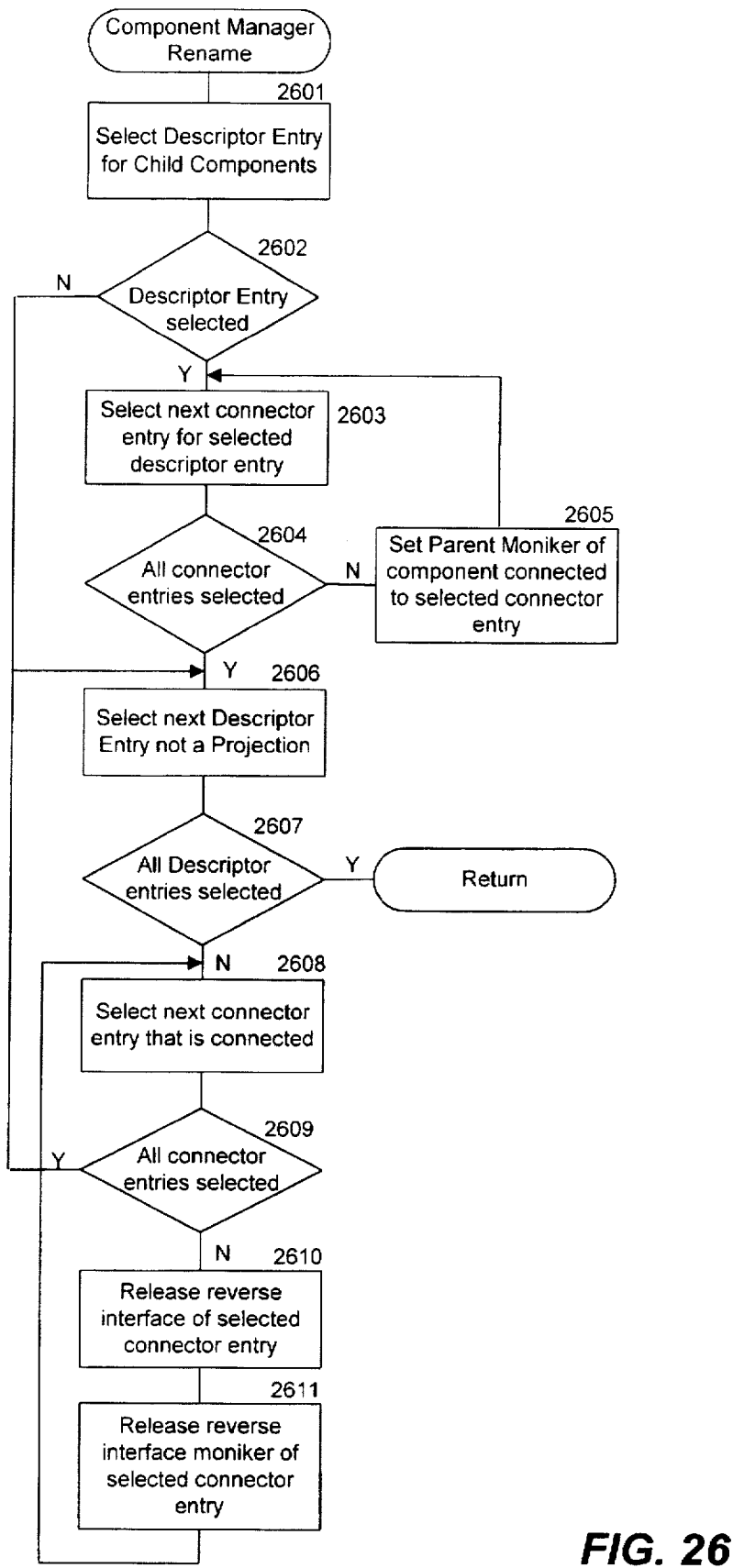
FIG. 26 is a flow diagram of the private method Rename of the IComponent interface.

FIG. 26 is a flow diagram of the private method Rename of the IComponent interface. The method sets the parent moniker of each child component of this component to the passed moniker. The method also disconnects connectors. In step 2601, the method selects the descriptor entry in the DEList for the connector to the child components. In step 2602, if the descriptor entry is selected, then this component may have child components and the method continues at step 2603, else the method continues at step 2606. In step 2603, the method selects the next connector entry for the selected descriptor entry, starting with the first connector entry in the CEList. In step 2604, if all the connector entries have been selected, then the method continues at step 2606, else the method continues at step 2605. In step 2605, the method sets the parent moniker of the child component connected to the selected connector entry by invoking the method SetParentMoniker of the child component. The method then loops to step 2603 to select the next connector entry. In steps 2606 through 2611, the method loops disconnecting connectors. In step 2606, the method selects the next descriptor entry in the DEList that is not a projection. In step 2607, the if all the descriptor entries have been selected, then the method returns. In step 2608, the method selects the next connector entry in the CEList for the selected descriptor entry that is connected, starting with the first connector entry. In step 2609, if all the connector entries have been selected, then the method loops to step 2606 to select the next descriptor entry, else the method continues at step 2610. In step 2610, the method releases the reverse interface of the selected connector entry and sets the reverse interface to NULL. In step 2611, the method releases the reverse interface moniker of the select connector entry, sets the pointer to the reverse interface moniker to NULL, and loops to step 2608, to select the next connector entry.

Figure 27:
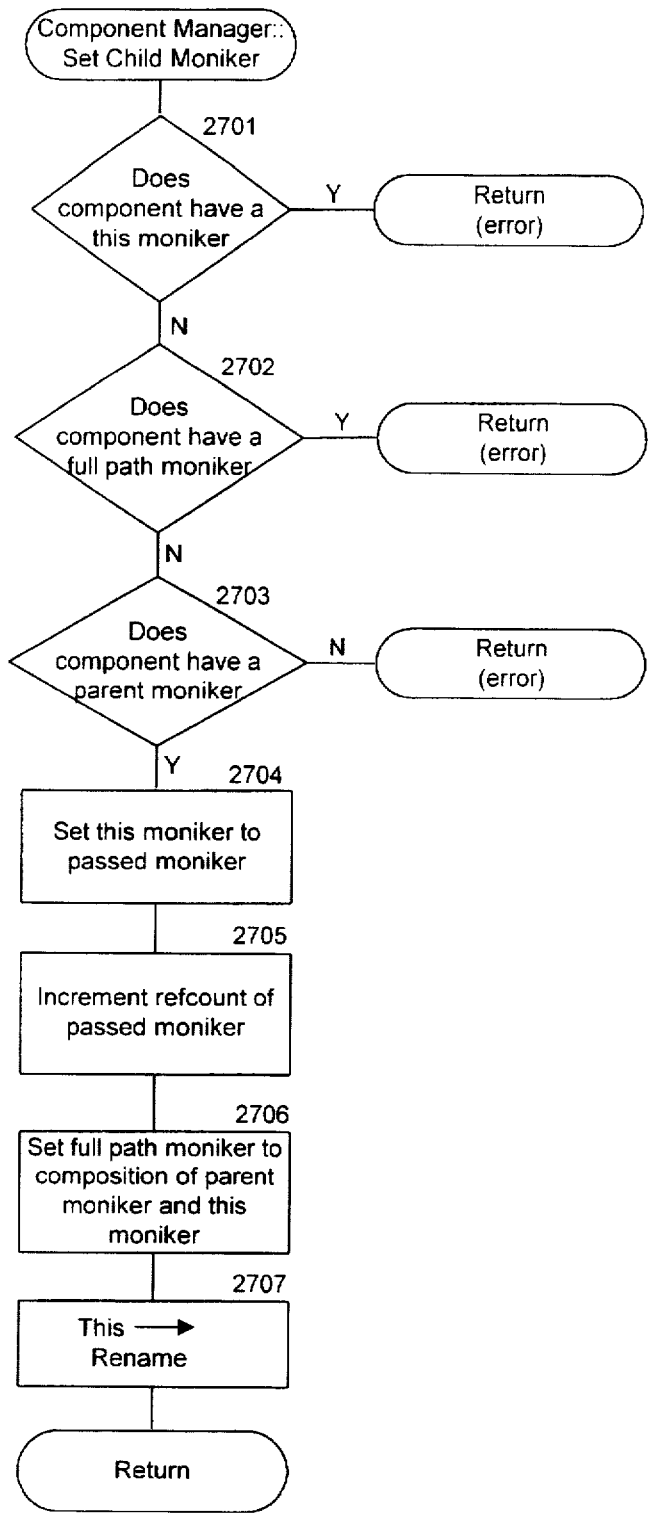
FIG. 27 is a flow diagram of the method SetChildMoniker of the IComponent interface.

FIG. 27 is a flow diagram of the method SetChildMoniker of the IComponent interface. The method SetChildMoniker sets the this moniker to the passed moniker. The method also invokes the method Rename of the component to rename its child components. In step 2701, if this component has a this moniker, then the method returns an error a component can only have its this moniker set once. In step 2702, if this component has a full path moniker, then this component is not a child component and the method returns an error. In step 2703, if the component does not have a parent moniker, then the method returns an error because the parent moniker should have been set when this child component was created. In step 2704, the method sets the this moniker (pmkThis) of this component to the passed moniker. In step 2705, the method increments the reference count of the passed moniker. In step 2706, the method sets the full path moniker of the component to the composition of the parent moniker and the this moniker by invoking the method ComposeWith of the parent moniker. In step 2707, the method invokes the method Rename of this component to rename its child components and then returns.

Figure 28:
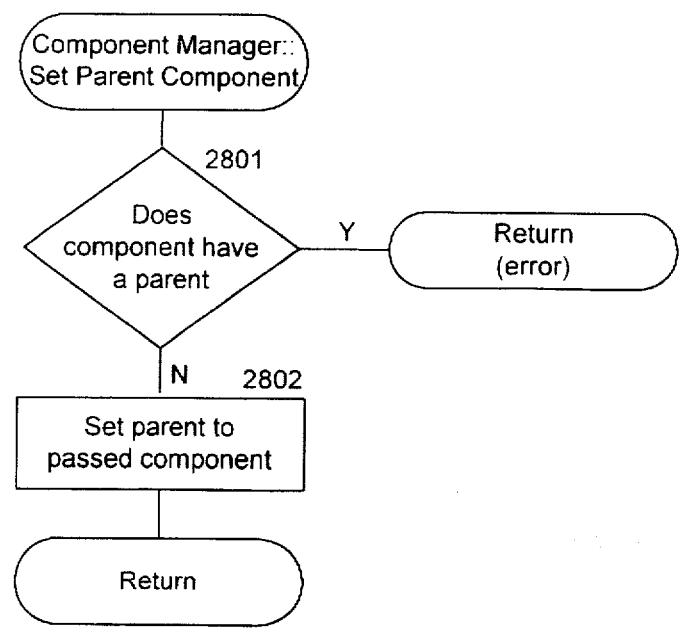
FIG. 28 is a flow diagram of the method SetParentComponent of the IComponent interface.

FIG. 28 is a flow diagram of the method SetParentComponent of the IComponent interface. The method SetParentComponent sets the parent (pParent) of this component to point to the passed component. This method does not increase the reference count of the parent to avoid circular references. In step 2801, if this component has a parent component or the passed component is NULL, then the method returns an error. In step 2802, the method sets the parent of this component to the passed component and returns.

Figure 29:
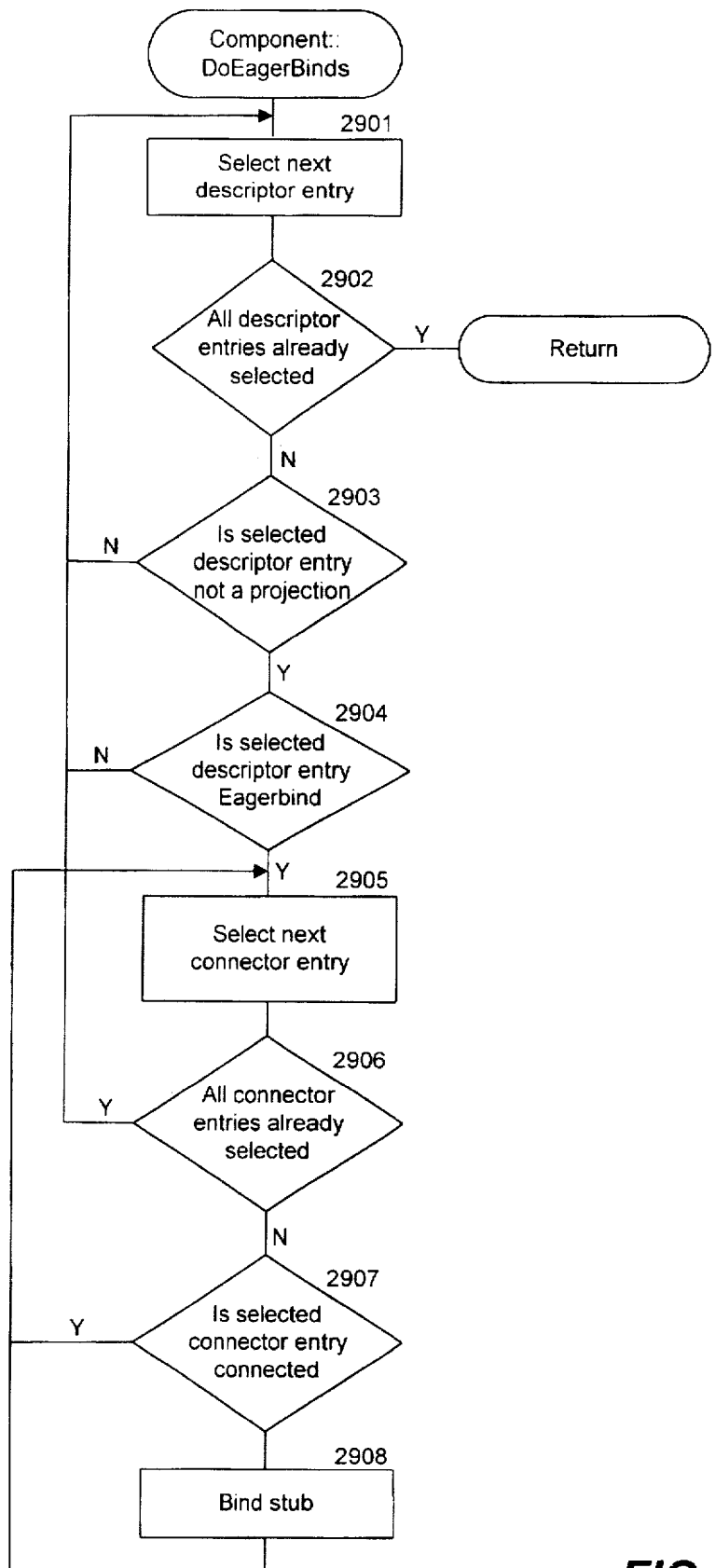
FIG. 29 is a flow diagram of the method DoEagerBinds of the IComponent interface.

FIG. 29 is a flow diagram of the method DoEagerBinds of the IComponent interface. The method binds the stubs for all connector entries that are not a projection, for which eager bind is specified, and that is not already connected. In step 2901, the method selects the next descriptor entry of this component, starting with the first. In step 2902, if all the descriptor entries have already been selected, then the method returns, else the method continues at step 2903. In step 2903, if the selected descriptor entry is not a projection, then the method continues at step 2904, else the method loops to step 2901 to select the next descriptor entry. In step 2904, if the selected descriptor entry indicates eager bind, then the method continues at step 2905, else the method loops to step 2901 to select the next descriptor entry. In step 2905, the method selects the next connector entry for the selected descriptor entry, starting with the first. In step 2906, if all the connector entries have already been selected, then the method loops to step 2901 to select the next descriptor entry, else the method continues at step 2907. In step 2907, if the selected connector entry is connected, then the method loops to step 2905 to select the next connector entry, else the method continues at step 2908. In step 2908, the method invokes the method BindStub of the IConnector interface of the selected connector entry and loops to step 2905 to select the next connector entry.

Code Table 2A contains a definition of the component descriptor. In the following, the field of the component descriptor is described.
ComponentDescriptor::cConnectors
    This field indicates the number of connector descriptors in the array of connector descriptors.
ComponentDescriptor::pConnDesc
    This field is a pointer to the connector descriptor array.
ComponentDescriptor::Create
    This field provides a pointer to a function provided by the user component that is invoked when the component is created. The user component is written to be aggregatable; the controlling IUnknown passed to this function is provided by the component manager. The component manager aggregates the user component into itself. The user component is passed a pointer to the component manager which can be used to obtain certain services. The user component provides an implementation of the IPersist interface. If the user component is to have persistent state, it also provides an implementation of the IPersistStorage interface. In this way, the component manager can ask the user component to persist itself.

Code Table 2B contains a description of a connector descriptor. In the following, the field of the connector descriptor is described.
ConnectorDescriptor::piid
    The interface id of the protocol that user component provides.
ConnectorDescriptor::piidm
    The reverse interface id of the protocol.
ConnectorDescriptor::iname
    The instance name of the protocol. This name is used to distinguish between multiple implementations of the same protocol provided by a user compound.
ConnectorDescriptor::flag
    Specifies certain control information about the connector.
CNNCTR_PLUG
    This flag indicates that the user component implements the plug interface of the protocol.
CNNCTR_JACK
    This flag indicates that the user component implements the jack interface of the protocol.
CNNCTR_REVIOPT
    This flag indicates that the reverse interface on the connection is optional. This might be used if such an interface is merely informational, or notifies the other component of certain events of which the other component may not be interested in.
CNNCTR_EAGERBIND
    This flag indicates that the connector is to bind to the reverse interface as soon as a connection is established, referred to as eager binding. This overrides the default lazy binding to interfaces.
CNNCTR_REVIPTR
    This flag indicates that the user component contains a reverse interface pointer.
CNNCTR_NONPERSISTENT
    This flag indicates that the connector is not to persist when all references to it go away. Such connectors are saved when a component is saved. These connectors are kept alive strictly by virtue of being referenced. Such connectors can be created on-demand by clients of a component, and monikers to them may be created. Typically, some service type component, which never initiates a connection on a bidirectional protocol, or which provides the implementation on a unidirectional protocol would use these.

CNNCTR_PRIVATE

This flag indicates that the protocol should not be projected or extruded to the outside of a component, but is only available for connecting from the component to a child component. Such a connector is not listed in descriptor enumerators or connector enumerators that are created from outside the component, but will be seen by such when they are created from within the component.

CNNCTR_AGGREGATE

This flag directs the component manager to aggregate the interface of this connector into the component manager and not to assume that the only interface on the connector is the one given in the connector descriptor. When an interface other than the one specified by piid is requested, the component manager invokes the IUnknown of the reverse interface.

ConnectorDescriptor::cMaxConnectors

This field specifies an initial limit on how many instances of this connector may be extruded from the component at any one time. The component may adjust this value at run-time. The adjusted value is persistent across subsequent activations of the component, and the value specified here is just the default for a newly created instance of the component. The value ULONG_MAX specifies that there is no limit to the number of instances that may be extruded.

ConnectorDescriptor::RevIfacePtrOff

This field contains the offset within the user component (from the interface) of the reverse interface pointer.

ConnectorDescriptor::OutStubf

These fields contain pointers to stub class factories for the particular protocol.

ConnectorDescriptor::Create

This field contains a pointer to a function in the user component that returns a pointer to the interface. This function is invoked when a connector is extruded. This function returns a pointer to the interface.

ConnectorDescriptor::Delete

This field contains a pointer to a function provided by the user component which is invoked when a connector is to be deleted.

ConnectorDescriptor::Connect

This field contains a pointer to a function provided by the user component that is invoked when a connection occurs. This provides an opportunity for the user component to do any initialization. The plug end of a connection is notified first, and then the jack end. Protocols are typically designed in such a way that the plug end may wish to issue some controlling calls during its connection notification. The notification comes after the connection is established, and the interfaces are ready for use.

ConnectorDescriptor::Disconnect

This field contains a pointer to a function provided by the user component that is invoked when a connection is disconnected. This provides an opportunity to do any necessary cleanup. The plug end is notified first, and then the jack end. After both ends have been notified of the disconnection, the actual disconnect occurs.

ConnectorDescriptor::Load and ConnectorDescriptor::Save

These fields contain pointers to functions provided by the user component that are invoked to load and save information. A user component may save state information associated with a connection across activations of the component.

Figure 30:
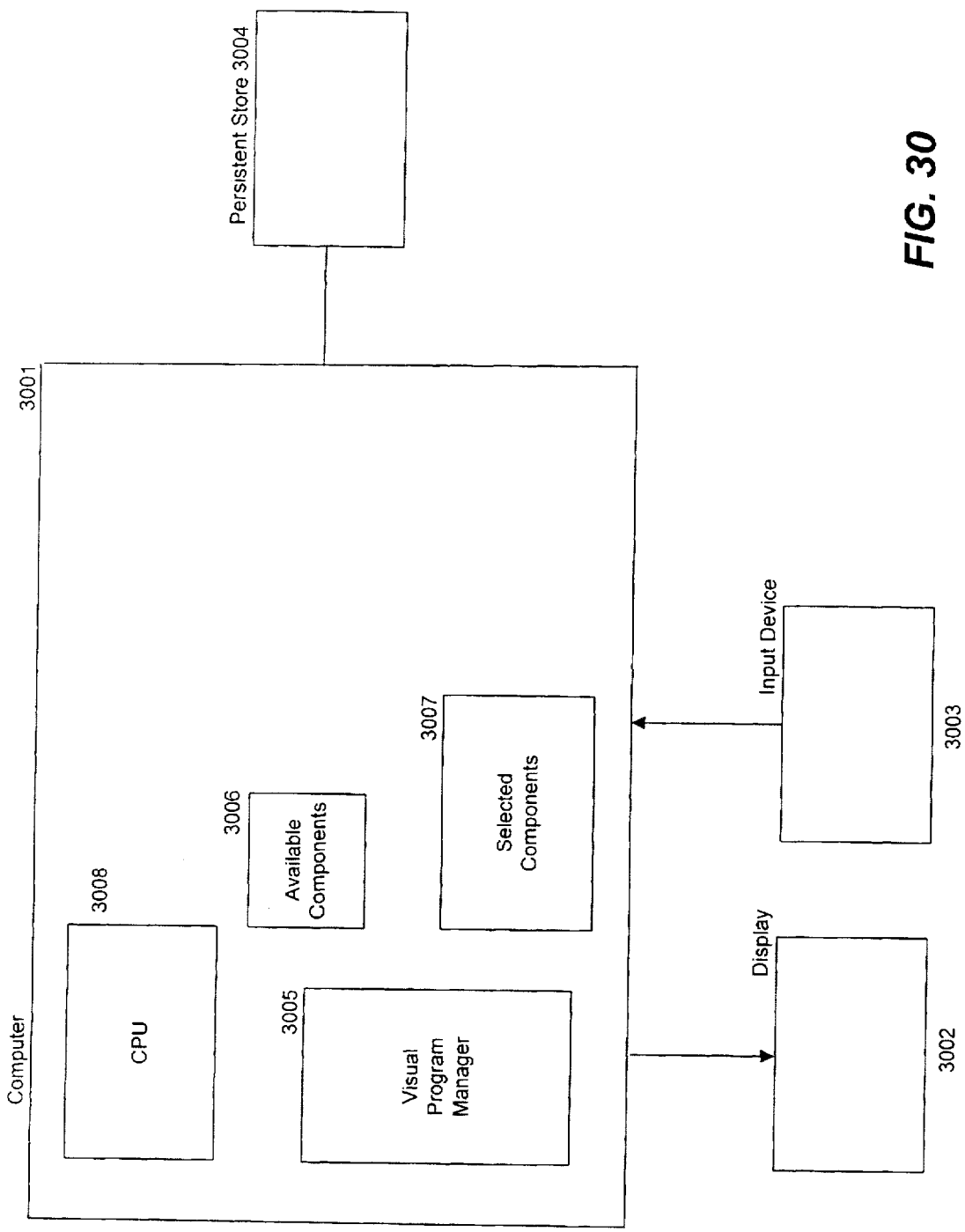
FIG. 30 is a block diagram illustrating a sample system using the present invention.

FIG. 30 is a block diagram illustrating a sample system using the present invention. The computer 3001 is connected to display device 3002, an input device 3003, and a persistent storage 3004. The computer 3001 includes a central processing unit 3008, a visual programming manager 3005, available components 3006, and selected components 3007. The visual programming manager manages the creation of visual programs. The visual programming manager displays a lists of available components on the display device. A programmer using the input device selects which listed components to include in a program. The visual programming manager creates an instance of each selected component. After the components are selected, then the programmer specifies how to interconnect the components. Each component provides a list of protocols that it supports. The visual programming manager displays the lists on the display device. The programmer specifies two components to connect through a protocol. The visual programming manager directs the specified components to extrude connectors for the protocol. The visual programming manager then directs the extruded connectors to connect.

Figure 31:
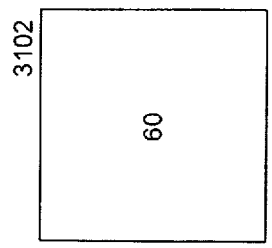
FIG. 31 is a diagram of the display of a sample visual program.
Figure 31:
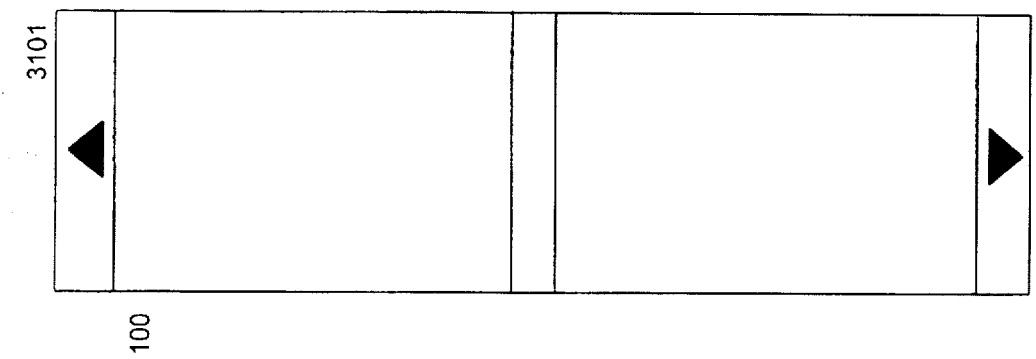

FIG. 31 is a diagram of the display of a sample visual program. The visual program displays a scroll bar 3101 and a display box 3102. The display box display a numeric value between 0 and 100 that corresponds to the position of the scroll bar thumb. When the thumb is moved by a user, the value in the display box is automatically updated. Conversely, when a new value is entered into the display box by a user, the thumb is automatically moved accordingly. To create the visual program, a programmer selects a scroll bar component and a display box component and then connects the components.

Figure 32:
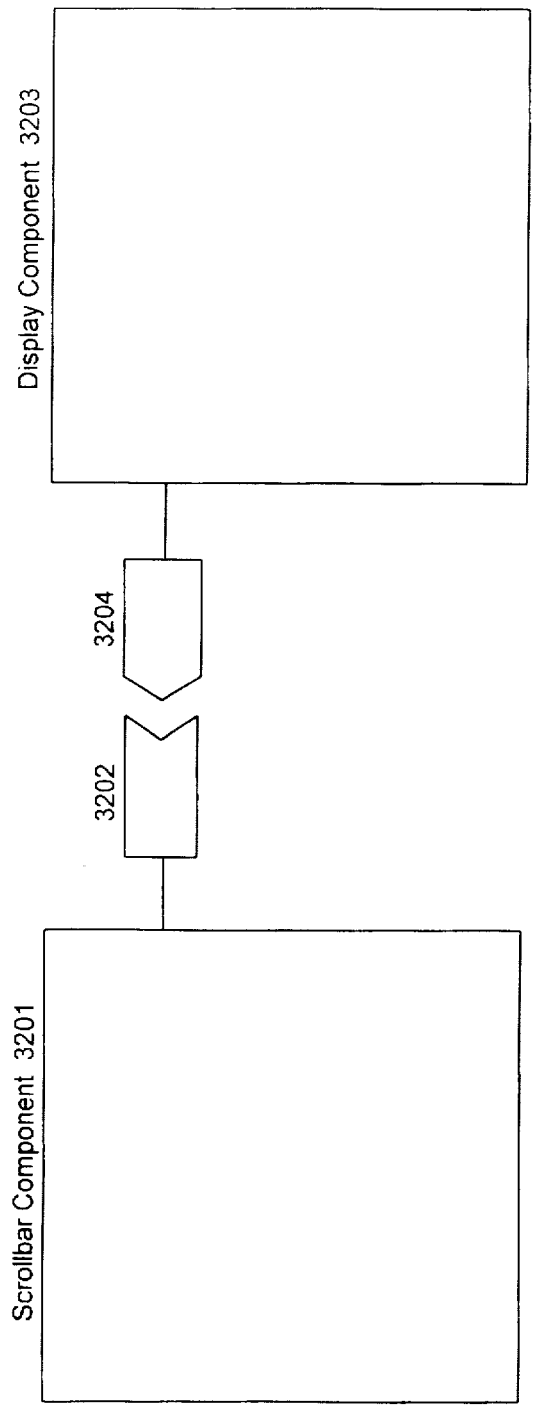
FIG. 32 is a block diagram of the instantiated components.

FIG. 32 is a block diagram of the instantiated components. The scrollbar component 3201 is shown with jack 3202 extruded. The display box component 3203 is shown with plug 3204 extruded. The jack 3202 and 3204 are connected. In operation, the scroll bar component effects the display of scroll bar 3101, and the display box component 3203 effects the display of display box 3102. When the thumb is moved, the operating system sends a message to the scroll bar component. In response to the message, the scroll bar component multicasts the message through its extruded jack. The display box component receives the message and changes its display box accordingly. Similarly, when a user enters a new value into the display box, the operating system sends a message to the display box component. In response, the display box component multicasts the message to the jacks connected through the protocol. The scroll bar component receives the message and changes the thumb accordingly.

Although the present invention has been described in terms of a preferred embodiment, it is not intended that the invention be limited to these embodiments. Modifications within the spirit of the invention will be apparent to those skilled in the art. The scope of the present invention is defined by the claims that follow.

We claim:

1. A method in a computer system for notifying a plurality of client components connected to a server component, each client component having a client component interface with a function member, the server component having a component manager and a user component, the component manager for connecting the client components to the server component, the component manager having a reference to the client component interface of each connected client component, the method comprising:

under control of the component manager, creating a multicasting object having an implementation of the function member of the client component interface;

under control of the user component, invoking the function member of the client component interface of the multicasting object; and under control of the invoked function member of the client component interface of the multicasting object, for each of the client components, retrieving the reference to the client component interface; and invoking the function member of the client component interface referenced by the retrieved reference.

2. A computer readable memory device for controlling a computer in accordance with the method of claim 1.

3. A method in a computer system for sending a message to a plurality of client components connected to a server component, each client component providing a client component interface, the client component interface having a function member, the server component having a reference to the client component interface of each client component, the method comprising:

creating a multicasting object having an implementation of the function member of the client component interface;

invoking the function member of the client component interface of the multicasting object; and under control of the invoked function member of the client component interface of the multicasting object, for each of the client components, retrieving the reference to the client component interface of the client component; and invoking the function member of the client component interface referenced by the retrieved reference.

4. The method of claim 3 wherein the server component has a component manager and a user component and including the step of under control of the user component, requesting the component manager to create the multicasting object and wherein the step of creating is performed by the component manager and the step of invoking the function member of the client component interface of the multicasting object is performed by the user component.

5. The method of claim 4 wherein the client component interface includes a plurality of function members and including selecting a function member of the client component interface through which to send the message to the client component such that the steps of invoking the function member of the client component interface invokes the selected function member.

6. The method of claim 3 including for each client component, creating a connector object and storing the reference to the client component interface in the created connector object.

7. A computer system for multicasting a message comprising:

means for connecting a plurality of client components to a server component, each client component having a client component interface with a plurality of member functions;

means for creating a multicasting object, the multicasting object having an implementation of each function member of the client component interface, each implementation for retrieving the references to each client component interface and invoking the function member referenced by each retrieved reference;

means for selecting a function member of the client component interface; and means for invoking the selected function member of the client component interface of the created multicasting object, wherein the selected function member invokes the selected function member of the client component interface of each client component.

8. A method in a computer system for delayed binding to a first component interface of a first component, the first component being connected to a second component, the first component interface having a function member, the method comprising:

creating a delayed binding object having an implementation of the function member of the first component interface;

storing a reference to the delayed binding object;

when the second component is to invoke the function member of the first component interface of the first component, retrieving the stored reference;

when the retrieved reference refers to the delayed binding object, invoking the function member of the first component interface of the delayed binding object; and under control of the invoked function member of the delayed binding object, binding to the first component interface of the first component to generate a reference to the first component interface of the first component;

replacing the stored reference to the delayed binding object with the generated reference to the first component interface of the first component; and invoking the function member of the first component interface of the first component; and when the retrieved reference refers to the first component interface of the first component, invoking the function member of the first component interface of the first component whereby binding to the first component interface of the first component is delayed until a function member of the first component interface of the first component is to be invoked by the second component.

9. The method of claim 8 wherein the second component includes a component manager and a user component, wherein the component manager creates the delayed binding object and passes the reference to the delayed binding object to the user component, and wherein the user component stores the passed reference, retrieves the stored reference, and invokes the function member of the interface referenced by the retrieved reference.

10. A computer readable memory device for controlling a computer in accordance with claim 9.

11. A computer system for delayed binding to a first component interface of a first component, a second component being connected to the first component through the first component interface, the first component interface having a function member, comprising:

means for creating a delayed binding object having an implementation of the function member of the first component interface, the implementation of the function member for binding to the first component interface of the first component to generate a reference to the first component interface of the first component, for replacing a reference to the first component interface of the delayed binding object with the reference to the first component interface of the first component, and for using the generated reference to invoke the function member of the first component interface of the first component;

means for storing the reference to first component interface of the created delayed binding object; and means for retrieving the stored reference when invoking the function member of the first component interface of the first component, wherein when the retrieved reference refers to the first component interface of the delayed binding object, invoking the function member of the first component interface of the delayed binding object to bind to the first component interface of the first component to generate the reference to the first component interface of the first component, to replace the reference to the first component interface of the delayed binding object with the reference to the first component interface of the first component, and to use the generated reference to invoke the function member of the first component interface of the first component; and when the retrieved reference refers to the first component interface of the first component, invoking the function member of the first component interface of the first component.

12. A method in a computer system for interconnecting two components, the method comprising the computer-implemented steps of:

creating a first component having a first component interface;

creating a second component;

creating a first connector object having a pointer to the first component interface;

creating a second connector object having a reference to a location in the second component; and connecting the first component to the second component by specifying the first connector object and the second connector object, by retrieving the pointer to the first component interface from the first connector object, by retrieving the reference to the location in the second component from the second connector object, and by storing the retrieved pointer in the referenced location, whereby the second component can access services of the first component interface through the pointer stored at the referenced location.

13. A method in a computer system for interconnecting two components, the method comprising the computer-implemented steps of:

creating a first component having a first component interface;

creating a second component having a location for storing a pointer to an interface of a component to which the second component is connected;

generating a pointer to the first component interface;

generating a reference to the location in the second component; and connecting the first component to the second component by specifying the pointer to the first component interface and the reference to the location in the second component and by storing the pointer in the referenced location, whereby the second component can access services of the first component interface through the pointer stored at the referenced location.

14. A computer readable memory device for controlling a computer in accordance with the method of claim 13.

15. A method in a computer system for interconnecting a first component to a second component, the method comprising:

creating the first component as a combination of a first instance of a component manager and a first user component, the component manager for managing the connecting of components, the first user component having a first user component interface;

creating the second component as a combination of a second instance of the component manager with a second user component;

under control of the first instance of the component manager, generating a pointer to the first user component interface;

under the control of the second instance of the component manager, generating a reference to a location in the second user component; and connecting the first component to the second component by specifying the pointer to the first user component interface and the reference to the location in the second user component, and by storing the retrieved pointer in the referenced location whereby the second user component can access services of the first user component interface through the pointer stored at the referenced location.

16. The method of claim 15 wherein the step of generating a pointer to the first user component interface includes the step of receiving the pointer to the first user component interface from the first user component.

17. The method of claim 15 including:

storing the generated pointer in a first connector object;

storing the generated reference in the second connector object; and specifying the pointer and the reference includes specifying the first and second connector objects.

* * * * *

UNITED STATES PATENT AND TRADEMARK OFFICE
CERTIFICATE OF CORRECTION

PATENT NO.   : 5,794,038
DATED        : August 11, 1998
INVENTOR(S)  : Stutz et al.

It is certified that error appears in the above-identified patent and that said Letters Patent is hereby corrected as shown below:

Column 10,
Line 37, "103" should read -- 203 --.
Line 38, "104" should read -- 204 --.

Column 21,
Line 63, "fill" should read -- full --.

Column 24,
Line 26, "fill" should read -- full --.

Column 30,
Line 48, "claim 9." should read -- claim 8."

Signed and Sealed this

Twenty-first Day of August, 2001

Attest:

*Nicholas P. Godici*

NICHOLAS P. GODICI
*Attesting Officer*     *Acting Director of the United States Patent and Trademark Office*